United States Patent
Berkery et al.

(10) Patent No.: US 7,403,975 B2
(45) Date of Patent: Jul. 22, 2008

(54) DESIGN FOR HIGHLY-SCALABLE, DISTRIBUTED REPLENISHMENT PLANNING ALGORITHM

(75) Inventors: Daniel John Berkery, Herndon, VA (US); Konanur Chandra Shekar, North Potomac, MD (US); Joseph Allen Jenkins, Arlington, VA (US); Joel Lamarr Lindsey, Jr., Kensington, MD (US); Thomas J. Drolet, Germantown, MD (US)

(73) Assignee: JDA Software Group, Inc., Scottsdale, AZ (US)

( * ) Notice: Subject to any disclaimer, the term of this patent is extended or adjusted under 35 U.S.C. 154(b) by 972 days.

(21) Appl. No.: 10/704,141

(22) Filed: Nov. 10, 2003

(65) Prior Publication Data
US 2004/0205074 A1    Oct. 14, 2004

Related U.S. Application Data

(60) Provisional application No. 60/424,708, filed on Nov. 8, 2002, provisional application No. 60/477,050, filed on Jun. 10, 2003.

(51) Int. Cl.
*G06F 15/167* (2006.01)
(52) U.S. Cl. .................. 709/213; 709/214; 709/224
(58) Field of Classification Search ................ 709/223, 709/224, 213, 214; 370/254; 700/100, 103
See application file for complete search history.

(56) References Cited

U.S. PATENT DOCUMENTS

| | | | | |
|---|---|---|---|---|
| 5,964,837 | A * | 10/1999 | Chao et al. | 709/224 |
| 6,898,475 | B1 * | 5/2005 | Ruml et al. | 700/103 |
| 6,901,448 | B2 * | 5/2005 | Zhu et al. | 709/228 |
| 6,996,502 | B2 * | 2/2006 | De La Cruz et al. | 702/188 |

* cited by examiner

*Primary Examiner*—ThuHa T. Nguyen
(74) *Attorney, Agent, or Firm*—Robert D. Atkins; Quarles & Brady LLP

(57) ABSTRACT

The present invention divides processing across multiple nodes to escape limitations placed by the processing power of commonly available application server platforms. The solution processing divides the problem into independently processed batches. Coordination of processing between nodes is achieved using a relational database tables and coordination for algorithm startup and initialization may be accomplished through a messaging system. The database table is loaded with rows to represent batches to be processed, and the independent processing nodes are given a message via the messaging system to start processing various jobs at a particular level. The nodes may then signal back when they can no longer find batches to process at that level. Once all nodes have completed a level, a message is sent to the nodes starts on to the next level. In this way, the messaging between the nodes is generally limited to two messages per level per node. The solution may be applied to supply chain problems by dividing the supply chain into separate levels and using separate nodes for calculations at each of the levels.

13 Claims, 22 Drawing Sheets

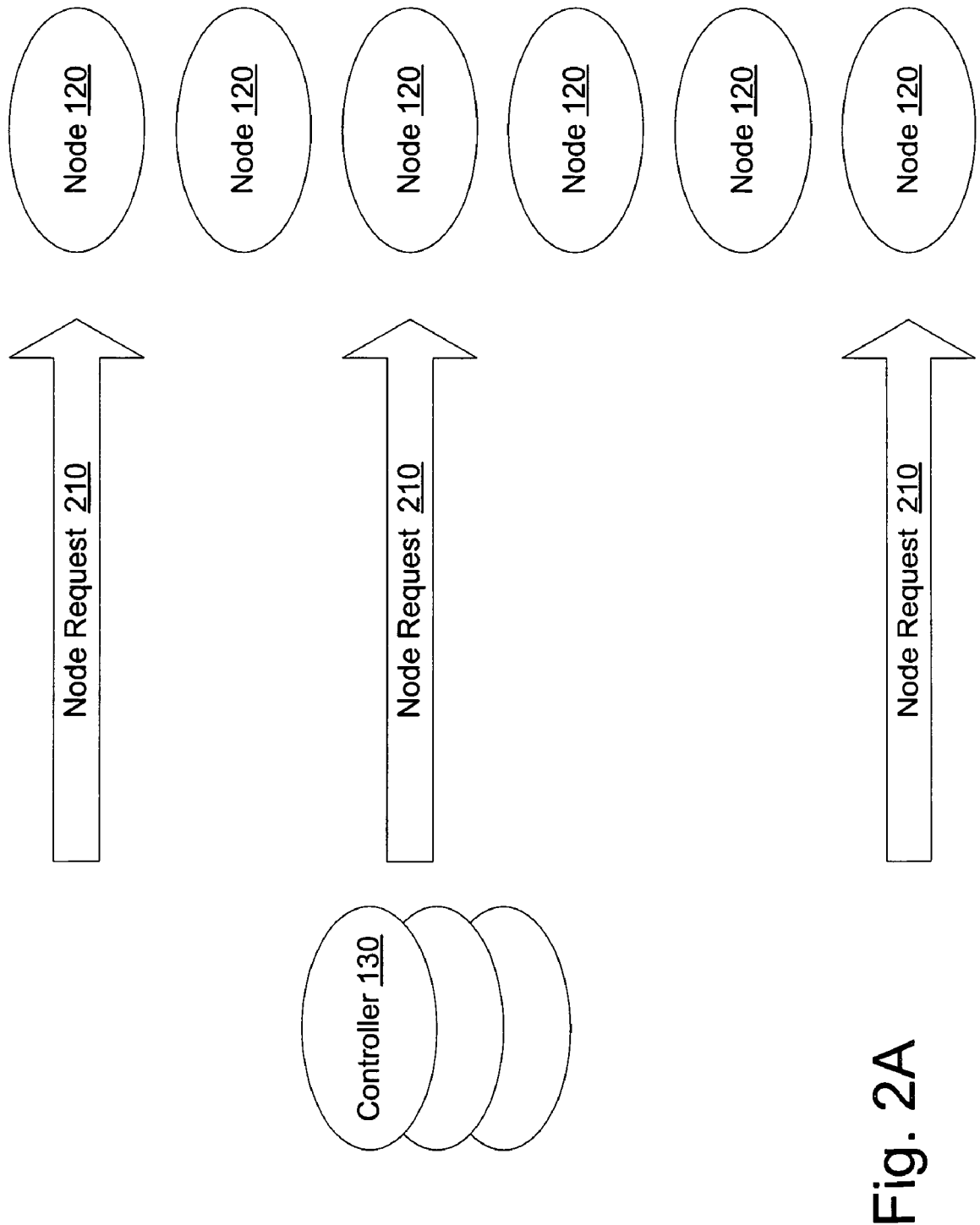

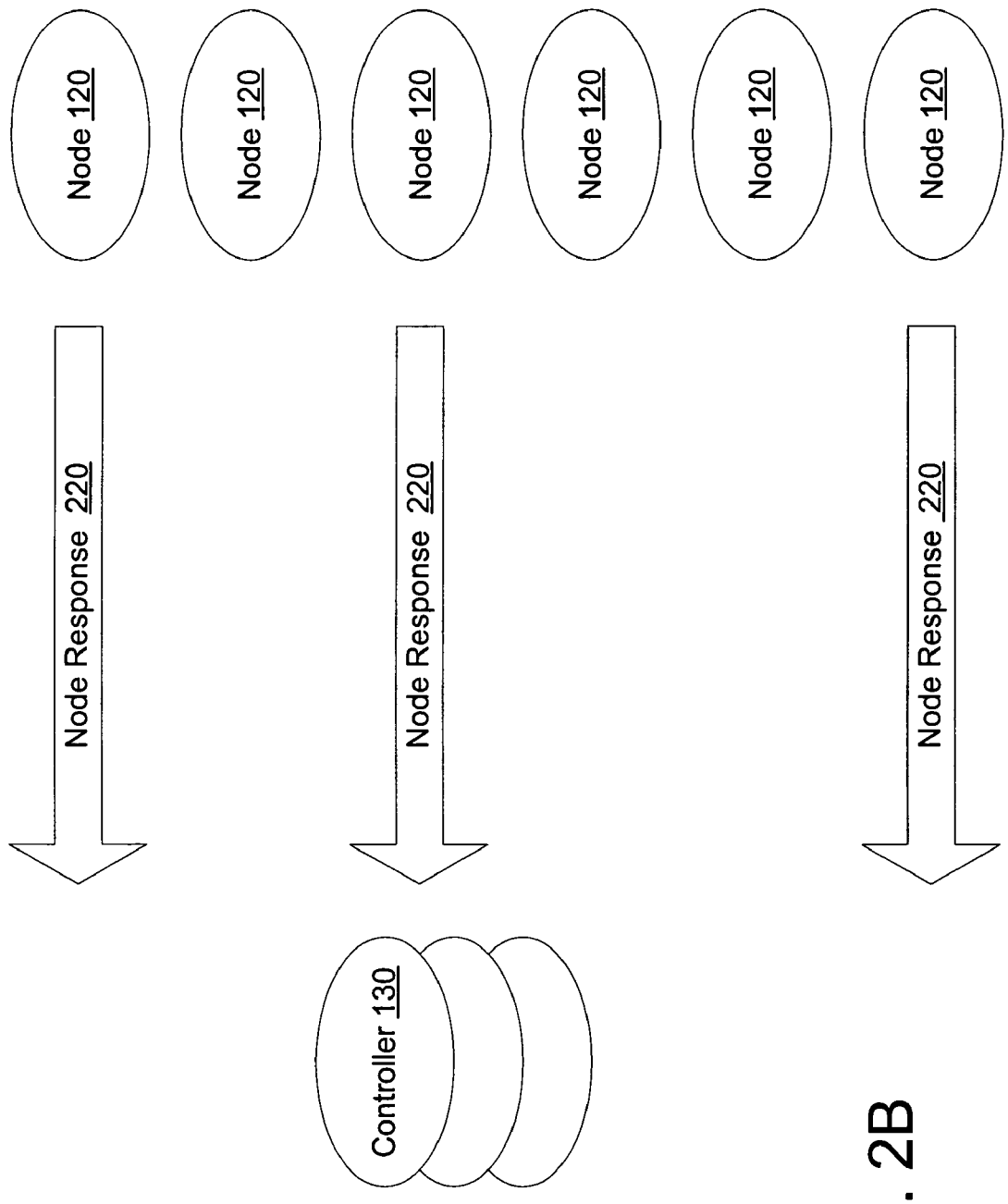

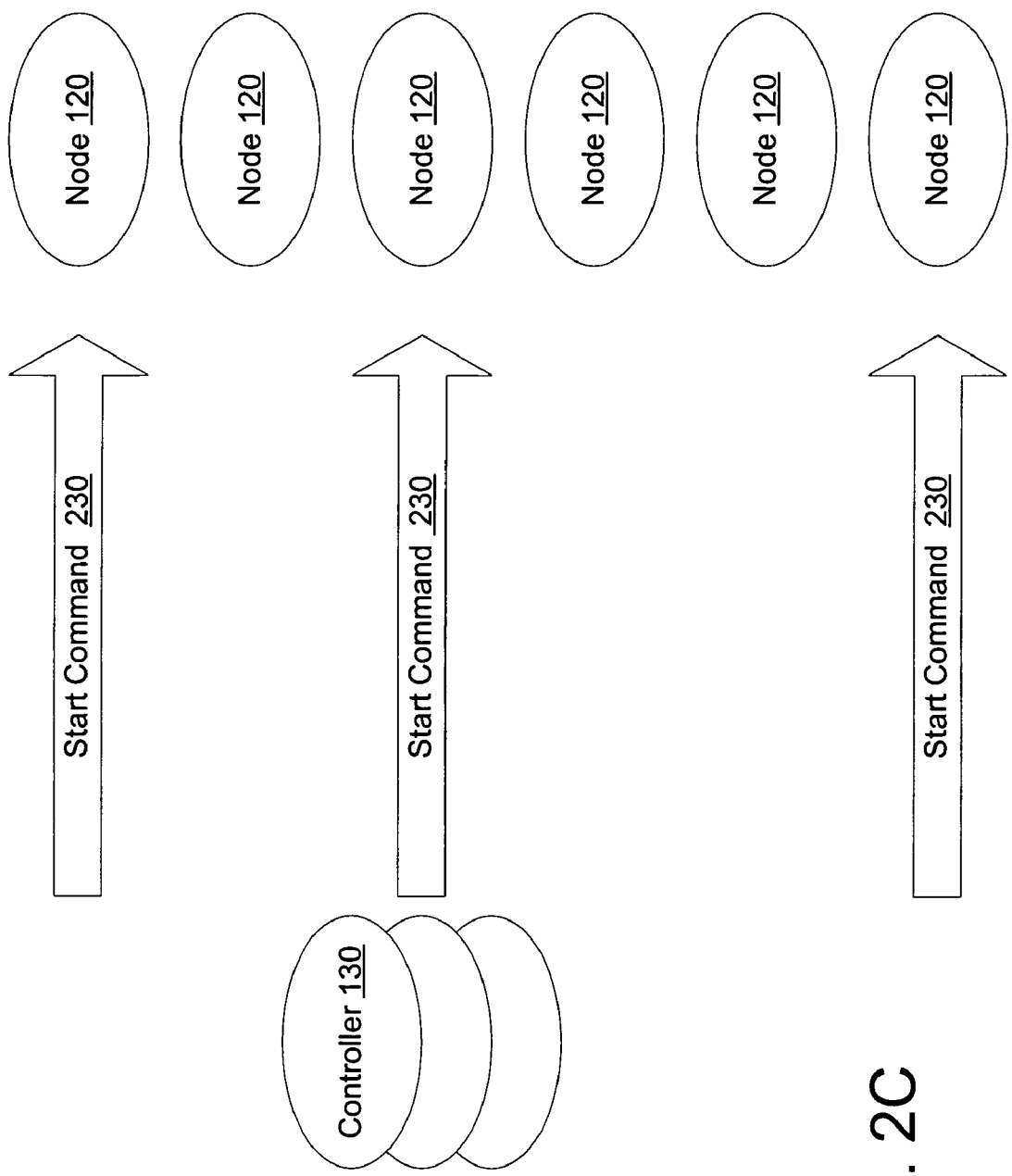

DESIGN FOR HIGHLY-SCALABLE, DISTRIBUTED REPLENISHMENT PLANNING ALGORITHM

CLAIM TO DOMESTIC PRIORITY

The present invention claims priority from U.S. Provisional Application No. 60/424,708 filed on Nov. 8, 2002 and Provisional Application No. 60/477,050 filed on Jun. 10, 2003. The subject matter of both of these provisional applications is hereby incorporated by reference in full.

STATEMENT REGARDING SPONSORED RESEARCH OR DEVELOPMENT

REFERENCE TO SEQUENCE LISTING

Not Applicable.

BACKGROUND OF THE INVENTION

1. Field of the Invention

The present invention relates to a system and related method providing a more robust computing environment through a program architecture that divides complex supply chain planning operations into smaller distinct tasks.

2. Background of the Invention

Numerous known techniques and devices are used to determine a time-phased replenishment plan for a multi-tiered supply chain network within an enterprise. The calculation of time-phased replenishment plans typically includes netting requirements at each location and determining dependent demand on source locations and subordinate items in a bill of material (BOM) relationship. This combination of functionality may be referred to as Material Requirements Planning ("MRP") and Distribution Requirements Planning ("DRP"). Known MRP and DRP solutions include the co-owned U.S. Pat. No. 6,415,196 for Manufacturing Scheduling Process With Improved Modeling, Scheduling And Editing For Solving Finite Capacity Planning Problems issued on Jul. 2, 2002 and pending U.S. patent application Ser. Nos. 10/184,963 for Manufacturing Scheduling Process With Improved Modeling, Scheduling And Editing For Solving Finite Capacity Planning, Ser. No. 09/984,346 for System And Method For Inventory And Capacity Availability Management, Ser. No. 09/974,801 for System And Methods For Scheduling Manufacturing Resources, Ser. No. 09/984,347 System And Method For Supply Chain Demand Planning And Forecasting, and Ser. No. 09/984,349 for System And Method For Ensuring Order Fulfillment. The subject matters of the patent and applications the is hereby incorporated by reference in full.

A typical replenishment network 500 is depicted in FIG. 5 (prior art). In FIG. 5, items A, B, and C are sold to customers from distribution centers 530 (level 0). The distribution centers 530 are replenished from a factory 520 (level 1) that produces and ships the items A, B, and C. In producing items A, B, and C, the factory 520 uses inputs D, E, and F, which are obtained from suppliers 510 (level 2). To plan replenishment of these item in the proper sequence, a typical approach is to "level code" the SKUs. Level coding starts at a customer facing SKU level 0 and proceeds to subordinate SKUs (having a subordinate relationship either via a BOM or sourcing relationship) at levels 1 and 2. Thus, the planning problem first involves estimating inventory and demand levels for the items A B, and C at the distribution centers 530. The planning problem next examines the ability of the factory 520 to produce the items the items A B, and C as needed replenish the distribution centers 530. In this examination, the planning problem looks, for instance, to factory's ability to satisfy the estimated demand for the items (such as the factory's inventory of the inputs D, E, and F and the factory's production capacity) and the delay associated with manufacturing and transporting the items. The planning problem further looks to the ability of the factory 520 obtain additional amounts of the inputs D, E, and F from the suppliers 510 and the delays associated with this obtaining of the inputs. It should be readily apparent that these computations grow enormously complex and entailed with increasing numbers of levels and locations (i.e., increasing number of SKUs). For instance, a typical retail store may have hundreds of thousands of items, supplied from hundreds of factories and distributors, each using numerous inputs.

In general, it is very technically challenging to scale the various MRP and DRP algorithms, such as those described above, to solve large supply chain problems because of the need to process the steps in a specific, linear order. For instance, a plan to replenish an item from a source location, as described above, should first determine that all required inputs have first been obtained. Given this need to process the replenishment planning of the SKUs in very specific orders, the processing of the supply chain algorithms across multiple machines on a network generally suffers from significant overhead in coordinating processing activities between nodes. Thus, one goal of the present invention is to develop a strategy for efficient partitioning of the processing without imposing significant overhead on process management activities or generating excessive network traffic to manage the solution processing.

Modern computer hardware commonly employ a modular architecture in which the hardware device integrates separately operating components including various temporary and permanent data storage systems, input/output devices for accessing the data storage, a processor for processing the stored data, and a communication system for connecting the various components. In this way, the design and construction a computer are relatively easy since separate parts can be selected and assembled as needed. Similarly, system repairs and enhancements are relatively easy since parts can be added or removed from the system as needed. The modular architecture also generally improves performance because the individual components may be optimized to perform their relative tasks. General computer performance is also improved through the concurrent performance of multiple tasks such as concurrent data processing and storage. Computer performance may be further improved by adding additional components, such as additional processors or storage units, to share tasks. The modular hardware architecture has the added benefit of improving reliability since the parts are relatively simple devices with fewer components. Reliability of the computer system may also be improved through redundancy of components, so that the tasks performed by a failed component may be readily performed by an alternative part. For instance, various RAID-type storage systems use redundant storage systems such that loss of data at one system may be recovered in a second system.

A typical replenishment network 500 is depicted in FIG. 5 (prior art). In FIG. 5, items A, B, and C are sold to customers from distribution centers 530 (level 0) The distribution centers 530 are replenished from a factory 520 (level 1) that produces and ships the items A, B, and C. In producing items A, B, and C, the factory 520 uses inputs D, E, and F, which are obtained from suppliers 510 (level 2). To plan replenishment of these items in the proper sequence, a typical approach is to "level code" the SKUs. Level coding starts at a customer facing SKU level 0 and proceeds to subordinate SKUs (having a subordinate relationship either via a BOM or sourcing relationship) at levels 1 and 2. Thus, the planning problem first involves estimating inventory and demand levels for the items A B, and C at the distribution centers 530. The planning problem next examines the ability of the factory 520 to produce the items A B, and C as needed replenish the distribution centers 530. In this examination, the planning problem looks, for instance, to the factory's ability to satisfy the estimated demand for the items (such as the factory's inventory of the inputs D, E, and F and the factory's production capacity) and the delay associated with manufacturing and transporting the items. The planning problem further looks to the ability of the factory 520 to obtain additional amounts of the inputs D, E, and F from the suppliers 510 and the delays associated with this obtaining of the inputs. It should be readily apparent that these computations grow enormously complex and entailed with increasing numbers of levels and locations (i.e., increasing number of SKUs). For instance, a typical retail store may have hundreds of thousands of items, supplied from hundreds of factories and distributors, each using numerous inputs.

Further goals of the present invention include:
(1) Providing a highly scalable architecture for algorithms with many separable work units that can be processed in parallel;
(2) Implementing a multi-process architecture to take advantage of multiple computers;
(3) Implementing multi-threading to take advantage of multiple processors;
(4) Implementing pipelining to insulate algorithms from communication latencies;
(5) Providing fault tolerance and recoverability;
(6) Providing centralized manageability; and
(7) Providing exceptional price/performance

BRIEF SUMMARY OF THE INVENTION

Modern computer hardware commonly employs a modular architecture in which the hardware device integrates separately operating components including various temporary and permanent data storage systems, input/output devices for accessing the data storage, a processor for processing the stored data, and a communication system for connecting the various components. In this way, the design and construction of a computer are relatively easy since separate parts can be selected and assembled as needed. Similarly, system repairs and enhancements are relatively easy since parts can be added or removed from the system as needed. The modular architecture also generally improves performance because the individual components may be optimized to perform their relative tasks. General computer performance is also improved through the concurrent performance of multiple tasks such as concurrent data processing and storage. Computer performance may be further improved by adding additional components, such as additional processors or storage units, to share tasks. The modular hardware architecture has the added benefit of improving reliability since the parts are relatively simple devices with fewer components. Reliability of the computer system may also be improved through redundancy of components, so that the tasks performed by a failed component may be readily performed by an alternative part. For instance, various RAID-type storage systems use redundant storage systems such that loss of data at one system may be recovered in a second system.

Embodiments of the present invention provide a solution that partitions the various processing using a design which analyses SKU order dependencies and available network processing node topology and divides the solution processing into independent processing batches which are dispatched processing nodes for processing. By definition, all SKUs within a level are independent of each other, so a level with N SKUs may be theoretically split amongst N processing nodes. In practice the number of processing nodes available are likely to be significantly smaller than the number of SKUs at a level. Further, there is efficiency to be gained by dispatching work in reasonable "chunks"; certain processing, particularly database I/O, may be more efficient when done for multiple SKUs at a time; secondly, the amount of communication to coordinate processing is reduced with larger nodes. The design allows for the size of "chunks" or batches to be parameterized to tune this for a particular supply chain model and network topology.

Embodiments of the present invention may achieve the coordination of processing between nodes using a relational database tables and coordination for algorithm startup and initialization may be accomplished through a messaging system. The database table is loaded with rows to represent batches to be processed, and the independent processing nodes are given a message via the messaging system to start processing various jobs at a particular level. The nodes may then signal back when they can no longer find batches to process at that level. Once all nodes have completed a level, a message is sent to the nodes starts on to the next level. In this way, the messaging between the nodes is generally limited to two messages per level per node.

By parallelizing the processing of the replenishment solution and allowing the easy addition of addition computational power to the solving of the replenishment problem, this approach allows much larger problem sizes to be addressed than previous designs. Further, this design takes full advantage of shared memory multiprocessor (SMP) architectures with large numbers of processors or a network of inexpensive processing machines (a complputing "blade" architecture) that are becoming more prevelent in today's information Technology environment. The use of a blade approach to computing power offers the capability to solve very large replenishment problems with significantly less expensive hardware resources than was previously possible.

Other embodiments of the present invention provide a system and method in which a complex computational task such as a complex calculation is divided into smaller tasks. In particular, an algorithm may have many separable work units that can be processed independently. For instance:

Producing a demand forecast for one Demand Forecast Unit (DFU) is completely independent from producing a forecast for another DFU, and Supply chain management software in which deploying one set of SKUs (inventoried products) is completely independent from deploying another set of SKUs.

Within the description of the present invention, the term "Units" is used to refer to independent packages of work. With the units, "Dependencies" impose ordering such that a dependent unit may not be started until all of the units on which it depends have been completed. "Groups" refer to sets of units that can be processed in parallel with not ordering restrictions. In other words, groups refer to sets of units that do not depend on one another.

Accordingly, the present invention provides a software architecture having separate node calculating an answer for each unit. To preserver dependencies, at any given time the set of nodes is collectively operating on units in a single group. In addition to processing units, each node continuously monitors itself and the other nodes. Finally, the set of nodes collectively monitors the progress of the overall task. Nodes collectively perform the parallel and non-parallel tasks necessary to perform the overall task. For instance, a portion of the initialization for the task is often non-parallel (e.g. cannot be broken up into independent units to be processed in parallel); this task is performed by the first node that identifies the tasks need for initialization. During this non-parallel initialization, the other nodes monitor the node performing the initialization-ready to step in if that node has a failure. Thus, at the task level there is distributed management so there is no single point of failure.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIGS. 2A-2F depict a node architecture implemented in the multi-node computing system of FIGS. 1A-1B in accordance with embodiments of the present invention;

DETAILED DESCRIPTION OF THE DRAWINGS

Figure 1A:
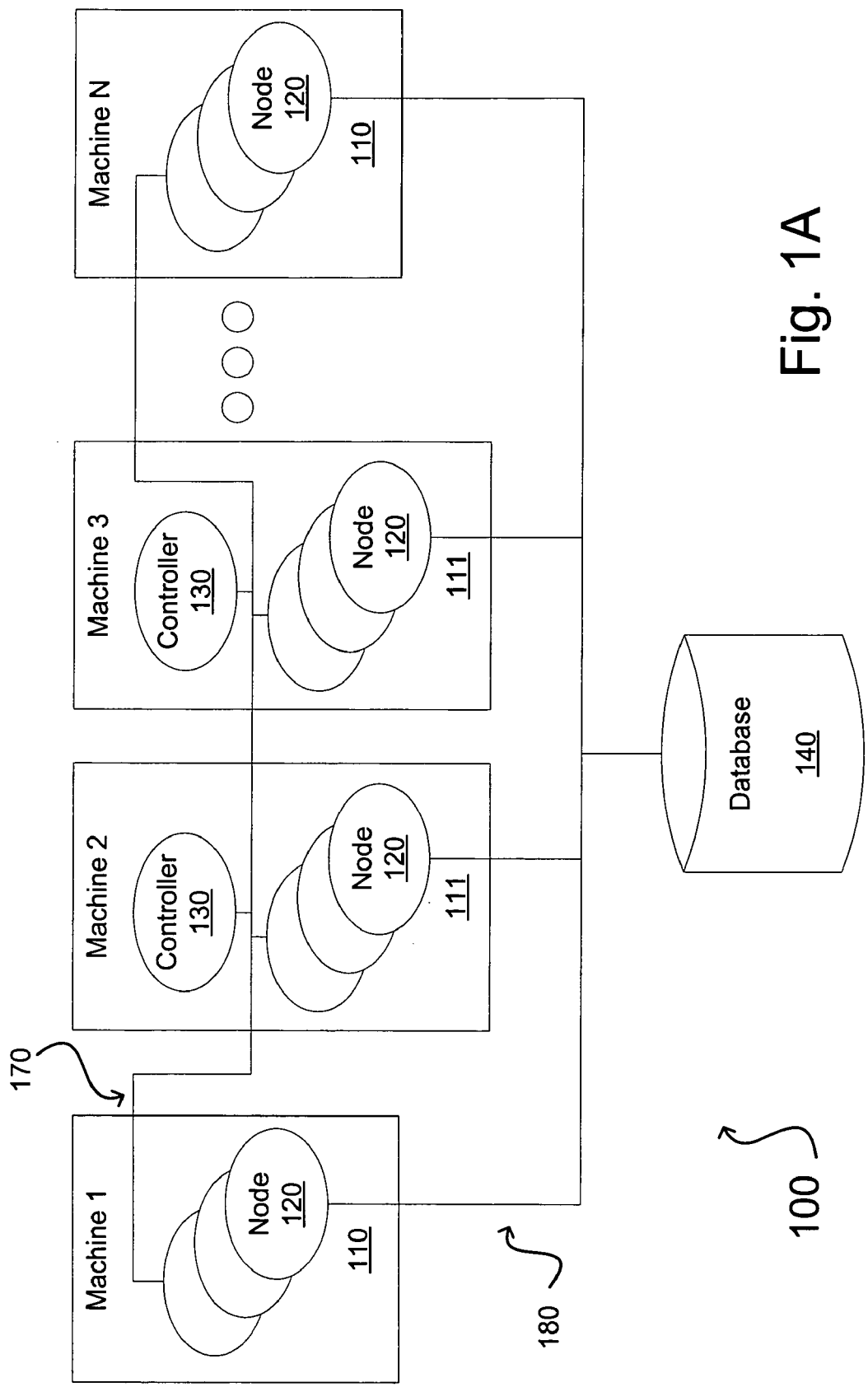
FIGS. 1A-1B depicts the components in a multi-node computing system in accordance with embodiments of the present invention.

As depicted in FIG. 1A, processor topology 100 employed in embodiments of the present invention. The processor topology 100 includes machines 110 and 111, each containing one or more processing nodes 120. Certain machines 120 further include a controller or node pool managers 130. As described in greater detail below, the controller 130 may be specifically created application for overseeing the operations of the nodes or merely more a generic node 120 temporarily assuming greater responsibilities and duties. The controllers 130 may communicate to the nodes 120 through a low bandwidth connection 170 since the communications between these components is relatively small. It should also be noted that there is generally no node-to-node communications. The nodes then communicate to a database 140 storing needed information and instructions through a high-bandwidth connection 180. In this way, a node 120, receives a command from the controller 130 over the low bandwidth connection 170. This command directs the node 120 to access a particular data and instructions locations in the database 140. The node 120 performs the instructions using the data and returns a result to the database 140. Along with the way, the node 120 may send one or more messages to the controller 130 indicating the status of that node.

The nodes 120 use the database 140 as the definitive record of job and node state and propagate signals to one another and to node pool managers 120 via the database. The database can be implemented as a cluster of multiple machines to avoid having a single point of failure at the database level. Additionally or as an alternative, the database could be run on fault tolerant hardware. The database used is a commercial database product and the system design is compatible with a number of database products.

Figure 1B:
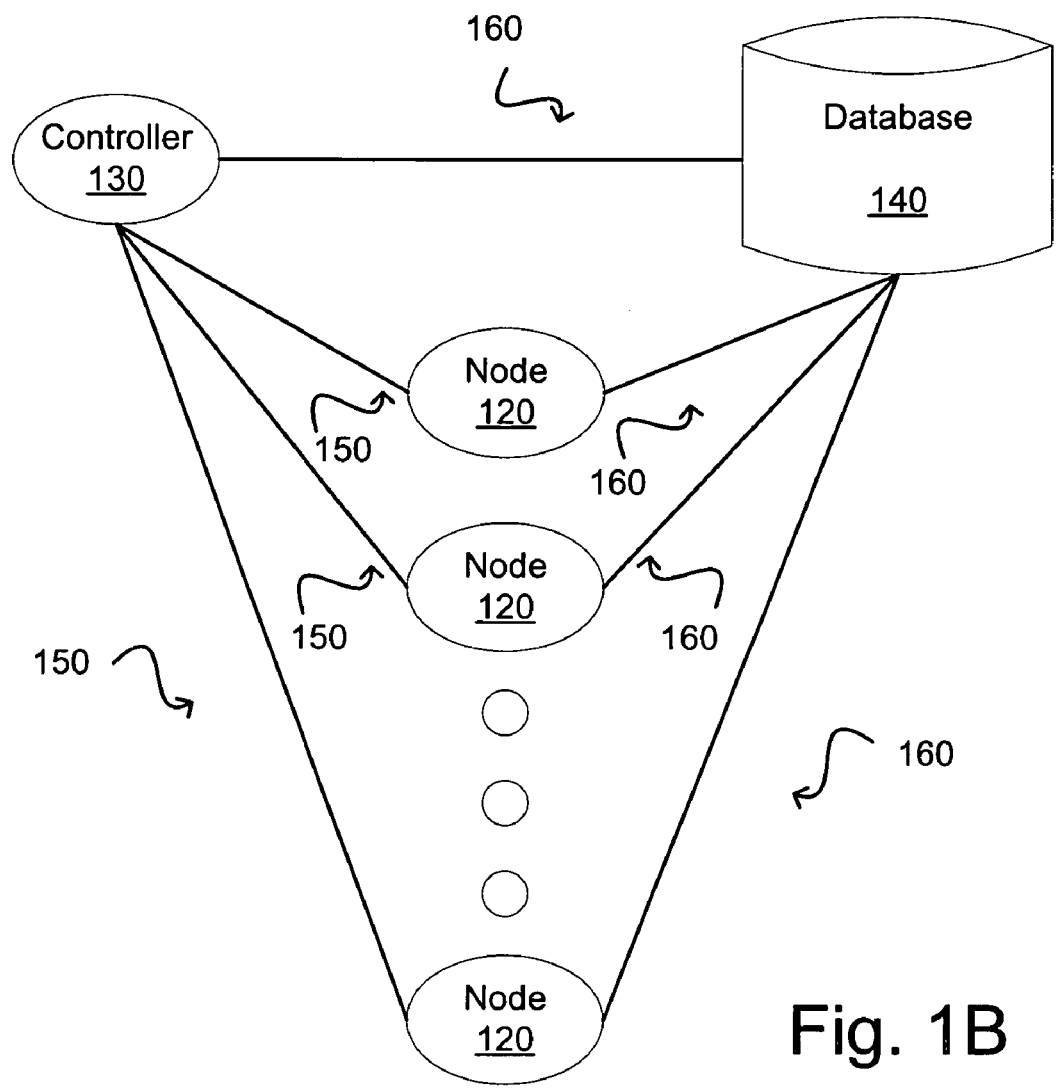

FIG. 1B shows a node topology 101 employed in certain embodiments of the present invention. In these embodiments, one processor node acts as a controller 130, and this controller node 130 receives the initial request to run the algorithm and partitions the problem into independent batches for the rest of the nodes 120 to process. This controller node 130 may also synchronize the nodes 120 between the various processing levels of the supply chain problem. Otherwise the processing by the nodes 120 proceeds independently. Once a node 120 receives a message to process SKUs for a given job ID at a given level, it starts to select batches to process from a table in the database 140 setup by the controller node 130. This node 120 proceeds until no more batches are available for processing at that level. The node 120 then forwards a message to the controller node 130 that processing for that level has finished.

The solution depicted in FIG. 1B depicts a messaging mechanism 150 between the controller 130 and the nodes 120 and a database mechanism 160 between the nodes 120 (including the controller 130) and the database 140. It should be appreciated that there is no restriction in the design to these particular technologies such that any asynchonous messaging mechanism may be used between nodes, and any database access mechanism may be used to access the database for processing.

In essence, the messaging system 150 allows separate, uncoupled applications to reliably communicate asynchronously. The messaging system 150 architecture generally replaces the client/server model with a peer-to-peer relationship between individual components, where each peer can send and receive messages to and from other peers. The messaging system 150 provides a host of powerful advantages over other, more conventional distributed computing models. Primarily, the messaging system 150 encourages a loose coupling between message consumers and message producers. This feature enables a high degree of anonymity between producer and consumer so that the message consumer does not care about who produced the message, where the producer lives on the network, or when the message was produced. This permits dynamic, reliable, and flexible systems to be built, whereby entire ensembles of sub-applications can be modified without affecting the rest of the system. Other advantages of messaging systems include high scalability (commercial implementations boast the ability to support tens of thousands of clients and tens of thousands of operations per second), easy integration into heterogeneous networks, and reliability due to lack of a single point of failure.

Because of the reliable and scalable nature of messaging system 150, it may be used to solve many business and computing science problems involved in the supply chain managements. In addition, the messaging system 150 brings together the disparate computer systems 110, 111. Overall, the messaging system 150 may be used to build highly reliable, scalable, and flexible distributed applications.

By parallelizing the processing of the replenishment solution and allowing the easy addition of additional computational power to the solving of the replenishment problem, this approach allows much larger problem sizes to be addressed than previous designs. Further, this design takes full advantage of shared memory multiprocessor (SMP) architectures with large numbers of processors or a network of inexpensive processing machines (a computing "blade" architecture) that are becoming more prevalent in today's information Technology environment. The use of a blade approach to computing power offers the capability to solve very large replenishment problems with significantly less expensive hardware resources than was previously possible.

In a preferred implementation, the messaging mechanism 150 and the database mechanism 160 are implemented using the Java programming language and related technologies developed by Sun Microsystems of Santa Clara, Calif. In particular, the messaging mechanism 150 may be the Java Messaging System (JMS). Likewise, the database mechanism 160 may be the Java Database Connectivity (JDBC). These components are now described in greater detail.

The Java Message Service (JMS) addresses various enterprise computing problems by providing a reliable, flexible service for the asynchronous exchange of critical business data and events throughout an enterprise. In the JMS, a type of enterprise bean, the message-driven bean, enables the asynchronous consumption of messages. Enterprise JavaBeans (EJB) container architecture may further enhance the JMS by allowing for the concurrent consumption of messages and by providing support for distributed transactions so that database updates, message processing, and connections to systems can all participate in the same transaction context.

The Java Message Service provides a consistent API set that gives developers access to the common features of many messaging system products. JMS supports the publish/subscribe and point-to-point models and allows the creation of message types consisting of arbitrary Java objects. Overall, a JMS-based messaging service 150 provides a consistent set of interfaces that messaging system clients can use independent of the underlying message system provider. Client applications are then portable across machine architectures and operating systems and portable across messaging products. As a result, client applications written to JMS will work without modification on all JMS compliant messaging systems.

Although the definition of a message varies greatly between messaging systems, JMS provides a unified means of describing and accessing messages. A JMS message consists of three parts, a message header, properties, and a Body. The message header is used for message identification. For example, the header is used to determine if a given message is appropriate for a subscriber. The properties similarly provide application-specific, provider-specific, and optional header fields.

The body holds the content of the message, and JMS supports several formats including TextMessages that wrap a simple String, ObjectMessages that wrap arbitrary Java objects (which must be serializable), and various other formats as well.

A TextMessage wraps a simple String object. This is useful in situations where only strings are being passed. It is expected that many messaging systems will be based on XML, and TextMessages are a natural container for these. Creation of a TextMessage object is simple, as exemplified by the following two lines of code:

```
TextMessage message =
    session.createMessage( );
message.setText("hello world");
```

A TextMessage created in this way is ready to be published to a messaging system.

In contrast, an ObjectMessage, as its name implies, is a message wrapping a Java object. Any serializable Java object can be used as an ObjectMessage. If multiple objects must be transmitted in a single message, then a Collection object (such as a List or a Set) containing several serializable objects can be used. An Object message may be created as follows:

```
ObjectMessage message=
    session.createObjectMessage();
message.setObject(myObject);
```

A typical JMS client can be built following these basic steps:

(1) Create a connection to the messaging system provider
(2) Create sessions, for sending and receiving messages
(3) Create MessageProducers and MessageConsumers to create or receive messages Once these steps have been performed, a message-producing client will create messages and publish them to topics, while a message-consuming client will listen for messages associated with a topic, and consume them as they arrive.

To illustrate in detail how this works, a typical message producer, as used to publish messages to a topic in a pub/sub messaging system, is now examined. Please note that exception handing code has been omitted in this discussion for clarity.

In JMS, a Connection is first created. A Connection provides the client access to the underlying messaging system, and performs resource allocation and management. Connections are created using a JAVA function ConnectionFactory. This code illustrates the steps involved in creating a connection:

```
Context messaging = new InitialContext( );
// get JNDI context
TopicConnectionFactory topicConnectionFactory =
    (TopicConnectionFactory)
messaging.lookup("TopicConnectionFactory");
TopicConnection topicConnection =
    topicConnectionFactory.createTopicConnection( );
```

Next, sessions are created. Sessions are lightweight JMS objects, which provide a context for producing and consuming messages. Sessions are used to build message producers and message consumers, as well as to build the messages themselves.

```
TopicSession session =
    topicConnection.createTopicSession(false,
        Session.CLIENT_ACKNOWLEDGE);
```

The two parameters to createTopicSession() control transactions and message acknowledgment.

The JMS then locates topic (also known as a subject, group, or channel). The topic identifies the messages being sent or received. The subscribers may subscribe to a given topic, while the publishers associate topics with the messages they publish. For instance, the following code create a topic called "WeatherData."

Topic weatherTopic=
messaging.lookup("WeatherData");

A connection is then started, such as the below code.
topicConnection.start();

During the above initialization steps, message flow is inhibited to prevent unpredictable behavior during initialization. Once initialization is complete, the connection must be told to initiate the message flow.

A Message Producer is then created. In the above-described publish/subscribe domain, a producer publishes messages to a given topic. This code shows the creation of a publisher and the subsequent building and publishing of a simple text message:

```
TopicPublisher publisher =
    session.createPublisher(weatherData);
TextMessage message = session.createMessage( );
message.setText("temperature: 35 degrees");
publisher.publish(message);
```

In this way a JMS based application is simple, yet provides the basis for building powerful, scalable, and highly reliable distributed systems. A similar process is followed to create subscribers, as well as JMS clients for point-to-point systems.

The solution depicted in FIG. 1B depicts a messaging mechanism 150 between the controller 130 and the nodes 120 and a database mechanism 160 between the nodes 120 (including the controller 130) and the database 140. It should be appreciated that there is no restriction in the design to these particular technologies such that any asynchronous messaging mechanism may be used between nodes, and any database access mechanism may be used to access the database for processing.

Returning now to FIG. 1B, the database mechanism 160 may be Java Database Connectivity (JDBC), a Java-based API that enables Java programs to execute SQL statements. This allows Java programs to interact with any SQL-compliant database. Since nearly all relational database management systems (DBMSs) support SQL, and because Java itself runs on most platforms, JDBC makes it possible to write a single database application that can run on different platforms and interact with different DBMSs. The JDBC technology further lets users access virtually any tabular data source from the Java programming language, thus providing cross-DBMS connectivity to a wide range of SQL databases and other tabular data sources, such as spreadsheets or flat files.

With a JDBC technology-enabled driver, a developer can easily connect all corporate data even in a heterogeneous environment, such as the node topology of FIG. 1A using computer 110, 111. JDBC provides a call-level API for SQL-based database access that allows developers to prepare applications that require access to enterprise data. In this way, JDBC makes it possible to establish a connection with a database or access any tabular data source; to send SQL statements; and to process the results.

The JDBC technology drivers fit into one of four categories. Type 1 drivers provides JDBC access via Open DataBase Connectivity (ODBC) drivers. ODBC is a standard database access method developed by Microsoft Corporation and enables access any data from any application, regardless of which DBMS is handling the data. ODBC manages this by inserting a middle layer, called a database driver, between an application and the DBMS. The purpose of this layer is to translate the application's data queries into commands that the DBMS understands. For this to work, both the application and the DBMS must be ODBC-compliant; i.e., the application must be capable of issuing ODBC commands and the DBMS must be capable of responding to them. In type 1 connections, the ODBC binary code and in many cases, database client code, is loaded on each client machine that uses a JDBC-ODBC Bridge. Sun provides a JDBC-ODBC Bridge driver, which is appropriate for experimental use and for situations in which no other driver is available.

In Type 2 JDBC connections, a native-API partly Java technology-enabled driver converts JDBC calls into calls on the client API for Oracle, Sybase, Informix, DB2, or other DBMS. Note that, like the bridge driver, this style of driver requires that some binary code be loaded on each client machine.

In Type 3 JDBC connections, a Java Driver for Database Middleware translates JDBC calls into the middleware vendor's protocol, which is then translated to a DBMS protocol by a middleware server. The middleware provides connectivity to many different databases. Similarly, in a type 4 interface, a Direct-to-Database Java driver converts JDBC calls into the network protocol used directly by DBMSs, allowing a direct call from the client machine to the DBMS server and providing a practical solution for intranet access.

With the JDBC API, no configuration is required on the client side. With a driver written in the Java programming language, all the information needed to make a connection is completely defined by the JDBC URL or by a DataSource object registered with a Java Naming and Directory Interface (JNDI) naming service. Zero configuration for clients supports the network computing paradigm and centralizes software maintenance. The JDBC API provides metadata access that enables the development of sophisticated applications that need to understand the underlying facilities and capabilities of a specific database connection.

In this way, the JDBC Connector forms the "glue" layer between a JDBC driver and an application server. It benefits both the JDBC driver vendors and application server vendors. The JDBC driver vendors can use the JDBC Connector to package their JDBC drivers as connectors (resource adapters), thus enabling plug-and-play with J2EE application servers. J2EE application server vendors can use JDBC Connector to allow pluggability of any third-party JDBC drivers into their products.

To use the JDBC, a user opens a Resource Adapter Archive (RAR) file that matches the transactional abilities of a driver, add the JDBC driver classes, and set a couple of configuration properties. While deploying, the application links the JNDI names of the JDBC resource references in the application to the objects. From there on, you use the standard JDBC API as usual. Your J2EE applications will run with no changes at all because with the JDBC Connector J2EE Applications don't need to know or care whether the JDBC driver is packaged as a connector or not.

In another implementation, the database mechanism 160 may use Java Data Objects (JDO). JDO is an API for transparent database access. A programmer can write code in the Java programming language that transparently accesses the underlying data store, without using database-specific code. JDO is a technology that is complementary to the JDBC. Its main strength is that it standardizes object databases and object/relational mappings for the Java programming language, allowing the programmer to use classes in the Java programming language instead of copying data between different data models. JDO hides SQL from the programmer so that a developer using the Java programming language does not need to learn SQL. However, the JDBC provides greater flexibility by giving programmers direct control over database access and cache management. In general, JDO is a suitable implementation (1) for persistent helper classes for Session Beans, (2) as delegate classes for Bean Managed Persistence Entity Beans, and (3) for delegate classes for Container Managed Persistence Entity Beans. While there are some similarities between JDO and the ODMG Java binding, as described above, JDO is based on a native Java language approach and is not a mapping between the Java programming language and any existing object-oriented data access standard.

Figure 2D:
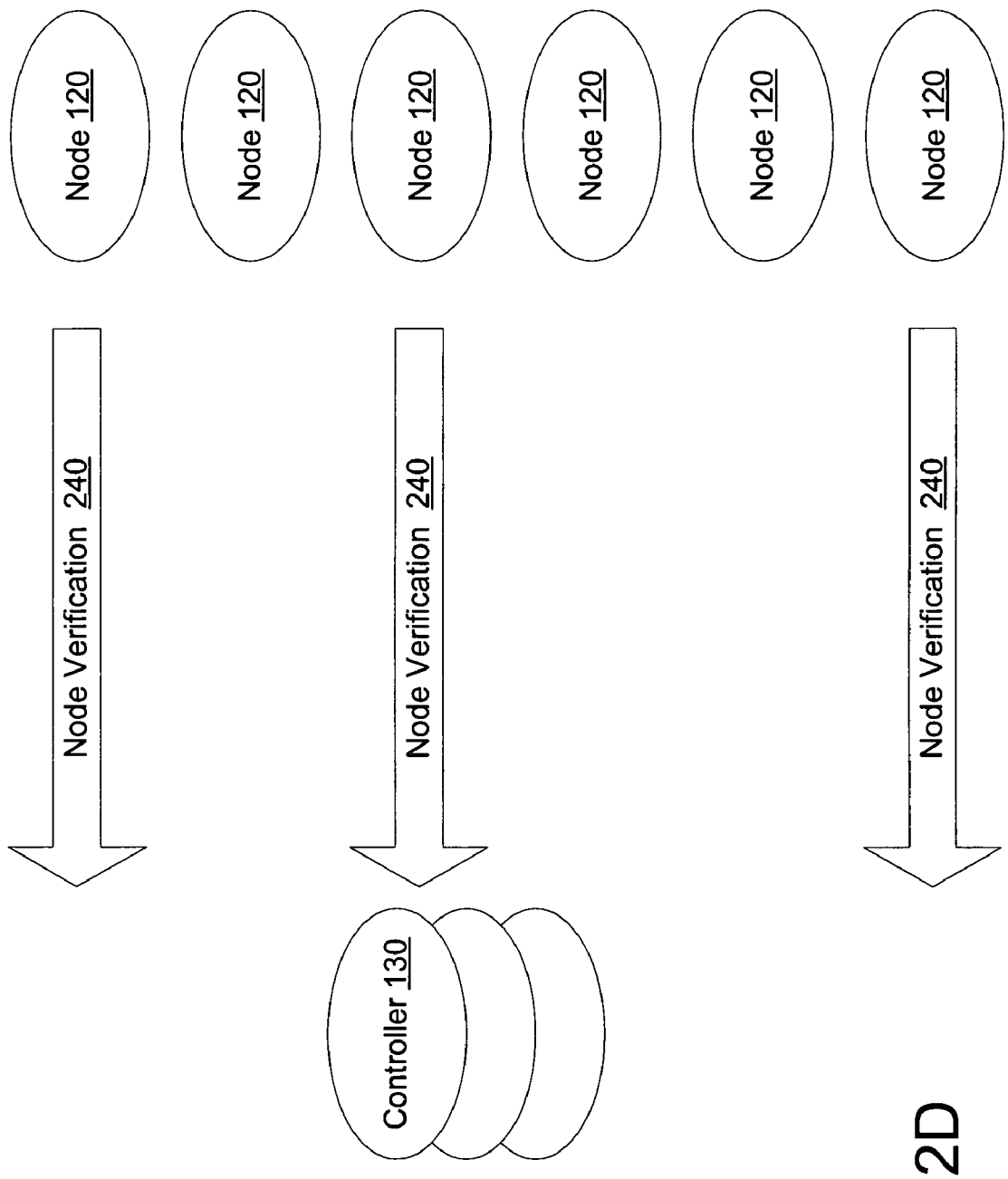
Figure 2E:
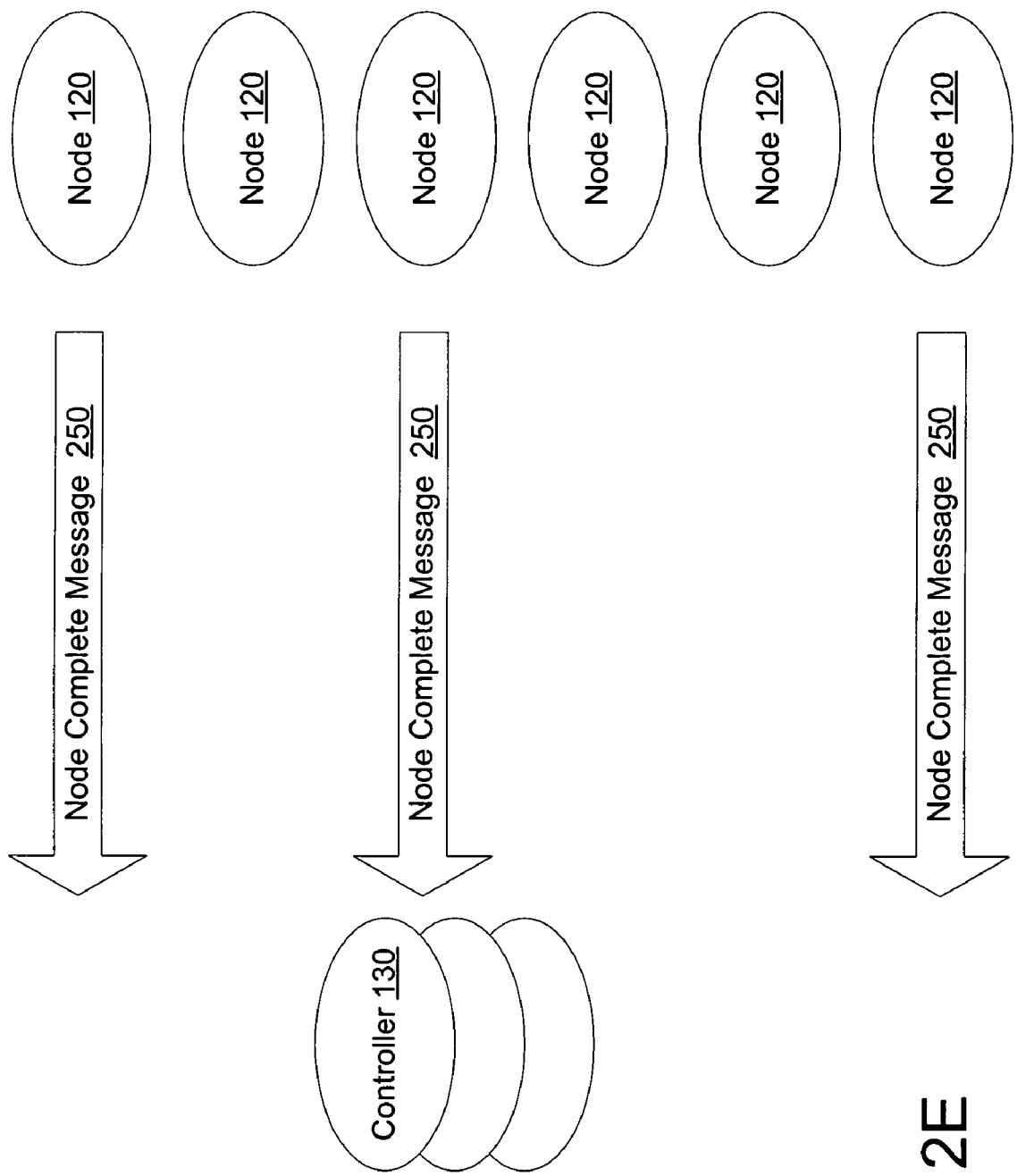
Figure 2F:
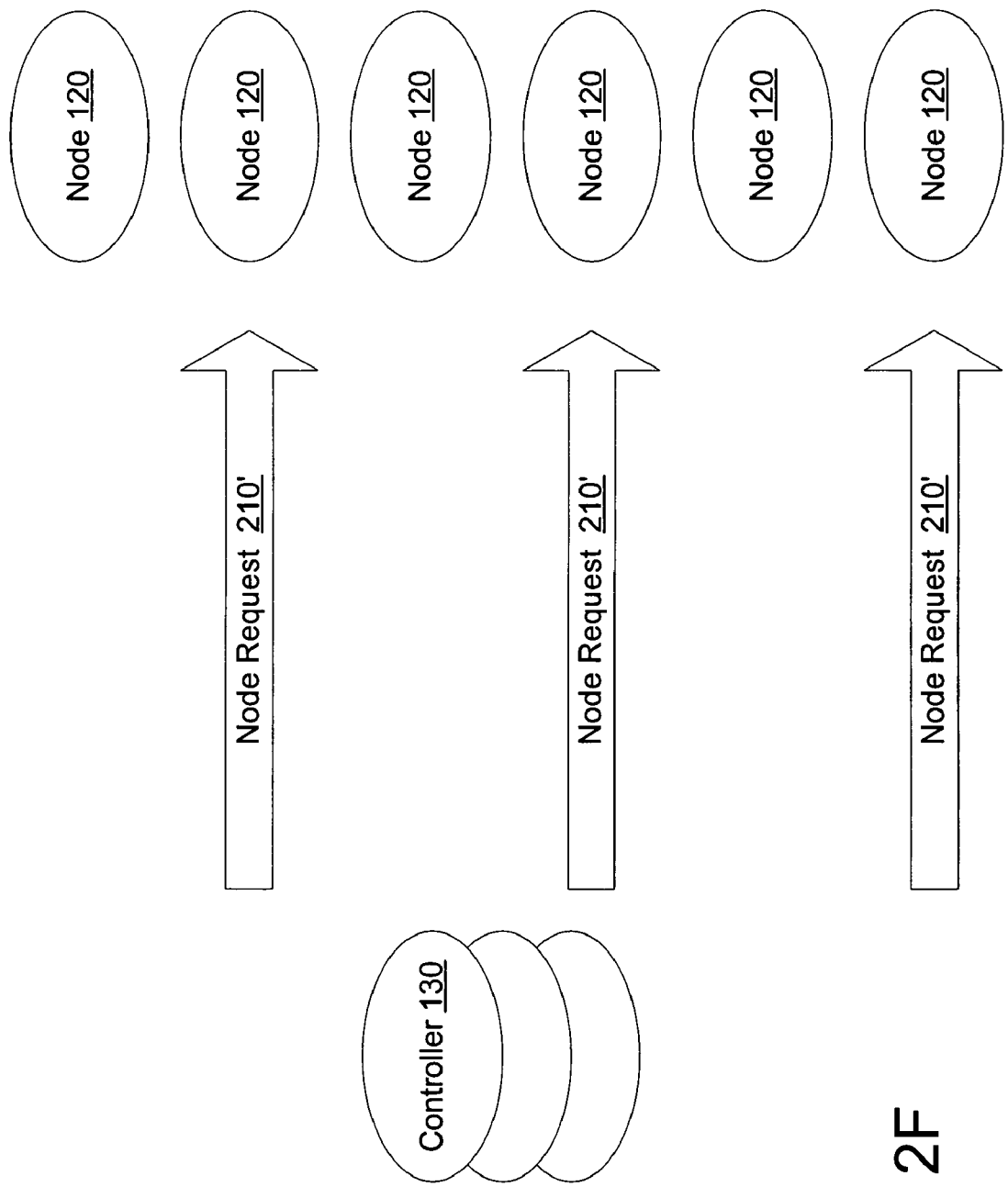

In one embodiment depicted in FIGS. 2A-2F, the nodes 120 are organized into multiple pools. Each pool runs on a single machine, but the set of pools can be spread across one or more machines. The nodes in each pool are managed by a node pool manager or controller 130. Specifically, the node pool manager 130 launches and kills nodes 120 as required, as depicted as node request 210 in FIG. 2A and as start command 230 in FIG. 2C. During their lifetime, however, the nodes 120 operate autonomously and communicate only with the database 140 (as depicted in FIGS. 1A-B) or to forward a node respond 220 or a node verification 240 to the controllers 130, as depicted respectively in FIGS. 2B and 2D. This configuration makes the architecture insensitive to both the number of nodes and the number of computers on which those nodes are running. The nodes 120 accomplish their work by checking a unit out from the database, querying the necessary related data from the database, performing the required calculations, writing their outputs to the database (or publishing results in another manner), and recording completion of the work unit in the database. The nodes 120 continuously process work units until all the work units in the group have been checked out. Once all the work units have been recorded as complete, the nodes 120 forward a completion message 250 to the controller 130 as depicted in FIG. 2E and move to the next group. This process continues until all groups are complete. Scalability across is enhanced via the standard intra-node architecture of a multi-stage, multi-threaded pipeline. By leveraging multiple threads of execution a single node 120 can utilize more than one processor when running on a multi-processor computer; this is vertical scalability. The pipeline model for multi-threading minimizes contention between the threads by requiring, in the general case, that only a few objects the queues between the stages of the pipeline-be synchronized for concurrent access by multiple threads. In addition to increasing performance, the minimization of synchronization also reduces development complexity.

It should be appreciated that the multi-stage pipeline, as depicted in FIGS. 2A-2F, makes the algorithm insensitive to latency, which is important for horizontal scalability. During the latency of operations that idle one of the threads, the multi-threaded architecture allows the processor to switch to another thread, which has work available. Thus, high processor utilization is achieved even when some operations have significant latency. Since running across multiple machines introduces latency in communications with the database server, the latency tolerance is a key feature in distributing across multiple machines without reducing per processor throughput. This feature enhances the cost effectiveness of the solution in two ways: 1) the solution can be run across many small machines rather than one (or a few) very large machines and 2) the machines need networks connections with high throughput but can tolerate significant latency. Small dual processor machines are significantly cheaper on a per processor basis than large multi-processor machines, so running efficiently on many small machines dramatically reduces hardware costs. Now that 1 gigabit Ethernet is mainstream and with 10 gigabit Ethernet on the horizon, high throughput LAN interfaces are very inexpensive so long as Ethernet latencies are tolerable-Ethernet latencies are quite acceptable for the current embodiment.

As depicted in FIGS. 3A-3L, embodiments of the current invention use a distributed control and monitoring technique to eliminate an single computer or single node as a single point of failure. In addition to processing work units, each node continuously monitors itself and the other nodes. If a node senses an internal failure it gracefully shuts down. If a node senses a failure in another node, it may post a request that the node's pool manager 130 to shut down the faulty node down. If the node pool manager does not comply promptly, one of the healthy nodes may further isolates that questionable node from the database and the job progresses without it, using known node interaction techniques. It can be seen that because monitoring and control are distributed among the set of nodes, there is no single point of failure.

While the current embodiment provides a solid default intra-process architecture, it is also compatible with alternate architectures so long as the comply with the contract to check out work units, process them, write results, and record completion of the work units. To support fault tolerance, the work units 120 must also implement compensating transactions to undo partially completed units during recovery. This is discussed in more detail below.

Nodes 120 may monitor each other by posting a "heartbeat" to the database 140. Each node 120 may post a heartbeat within a specified heartbeat interval. Posting a heartbeat indicates that the node 120 is still running, still in contact with the database 140, and still healthy. For nodes 120 that adopt the default pipeline architecture, the pipeline implements an internal application heartbeat. The pipeline monitors are working threads and assures that they post completion of at least one work unit within a specified interval. A pipelined node 120 is, by definition healthy, if and only if each of its threads is healthy. Because threads in non-bottleneck stages are subject to waits, the pipeline automatically suspends heartbeat checking for the duration of a thread's wait.

The application heartbeat assures that the process is not only still running but also processing work at the expected rate. Applying an application heartbeat allows the system 100 to detect certain types of failures that are not detectable in most architectures. These include infinite loops and unacceptably long waits on external calls. Infinite loops by definition mean that the work unit 120 causing the infinite loop will never be completed. In the pipeline architecture, such a work unit 120 will cause exactly one thread to go into the infinite loop. This thread will fail to post its application heartbeat and the monitoring thread will detect the failure and shutdown. External dependencies, such as retrieval of data from the database 140, pose a similar risk. There is always the risk that an external system will not respond quickly enough or will not respond at all. Again, this will cause exactly one thread at a node 120 to miss its application heartbeat interval. The monitoring thread will detect this issue and take appropriate measures, such as shutting down the node.

Because a preferred embodiment is implemented in JAVA (as described above), a response to a missed applications heartbeat by one thread is to shut down the node 120 and have the node pool manager 130 start a new node 120 in its place. This is not a limitation of the architecture or invention, but rather a limitation of the JAVA threading model. In particular, it is unsafe in JAVA to kill rogue threads and the Java Virtual Machine (JVM) makes no guarantees about the state of locks, when a thread is killed so other threads could be harmed or deadlocked when a rogue thread is killed. Thus, the best course of action is often to shutdown the faulty node 120.

When a node shuts down gracefully, it may marks the work units that it had checked out from the database 140 as "needing reprocessing". If another node 120 has to forcibly isolate a questionable node, it queries the database 140 and similarly marks the work units checked out to the questionable node as "needing reprocessing". These work units 120 are then processed with compensating transactions that restore them and any auxiliary data to its original state. Once the compensating transactions are complete and committed, the work units can be processed by any node just like any other work unit.

Figure 3A:
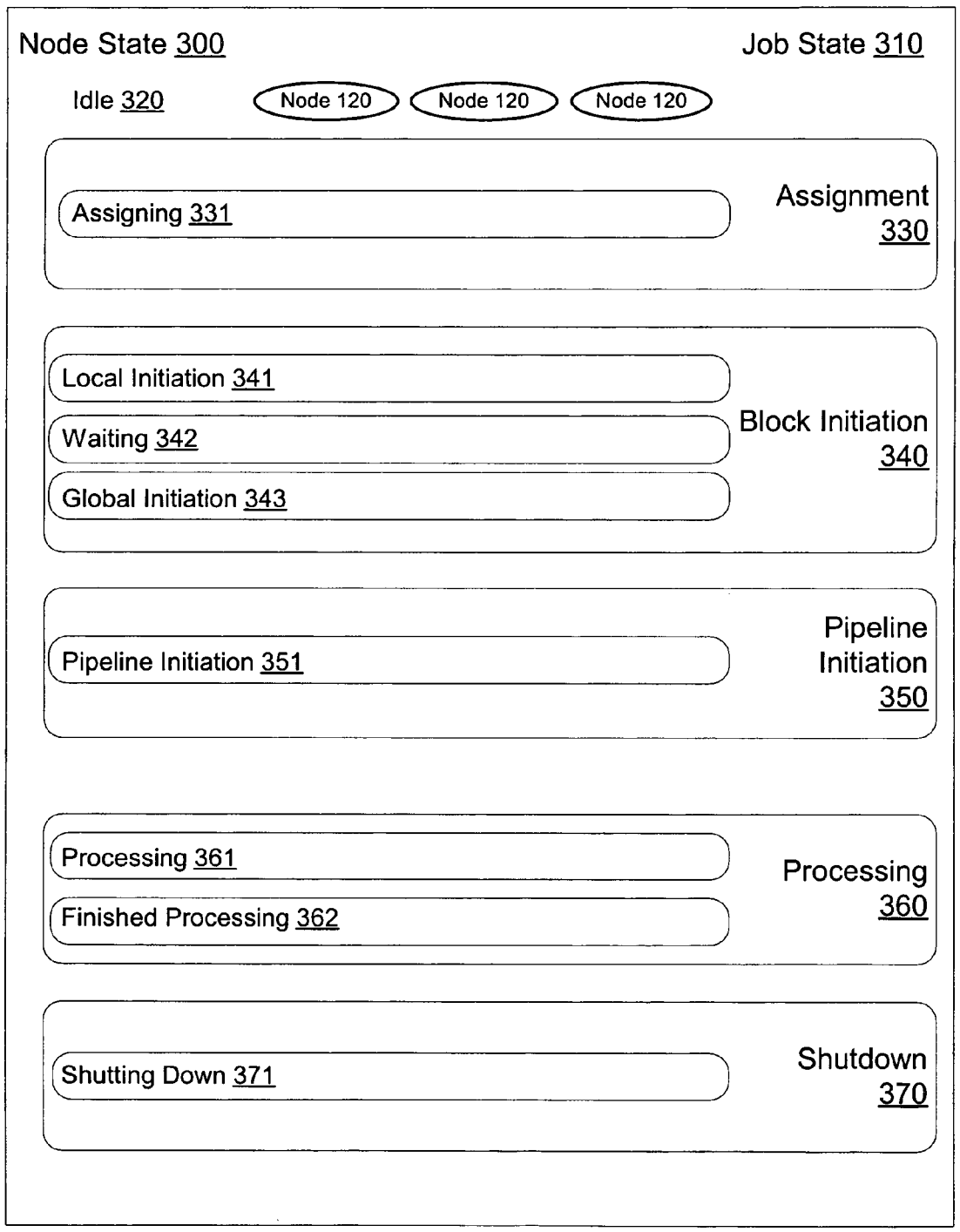
FIGS. 3A-3L depict the progression of nodes through various job and node states in distributed control and monitoring embodiments of the present invention.
Figure 3B:
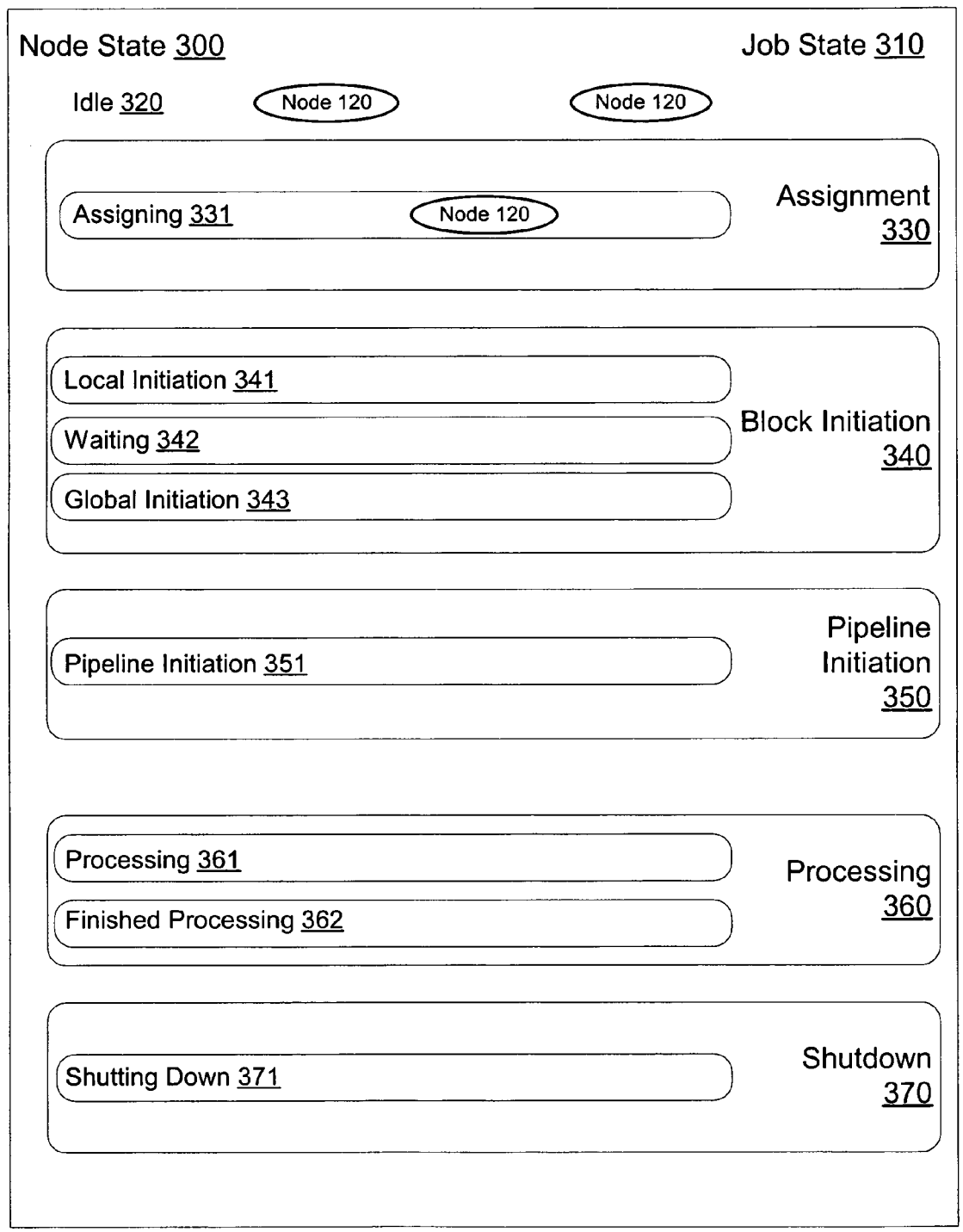
Figure 3C:
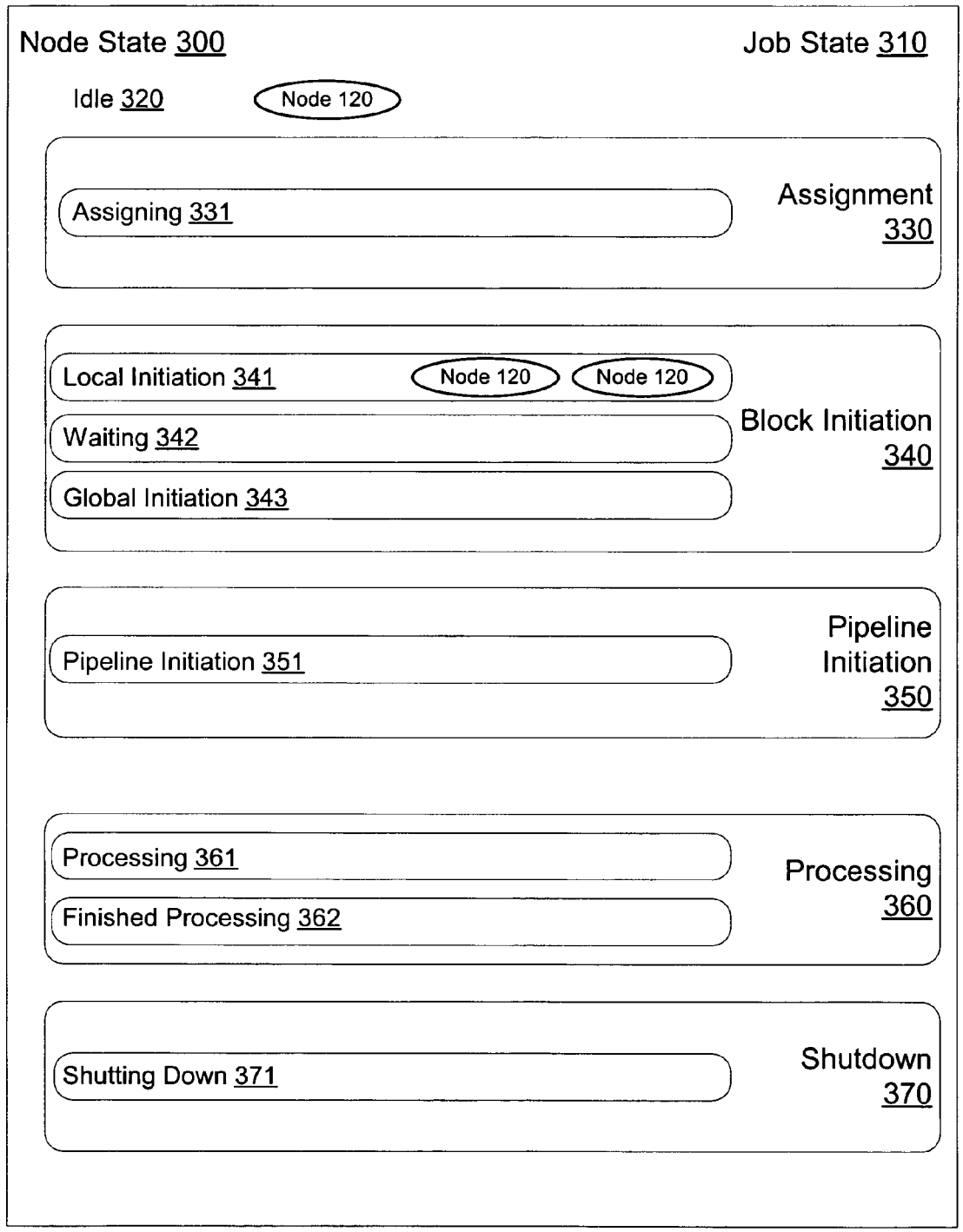
Figure 3D:
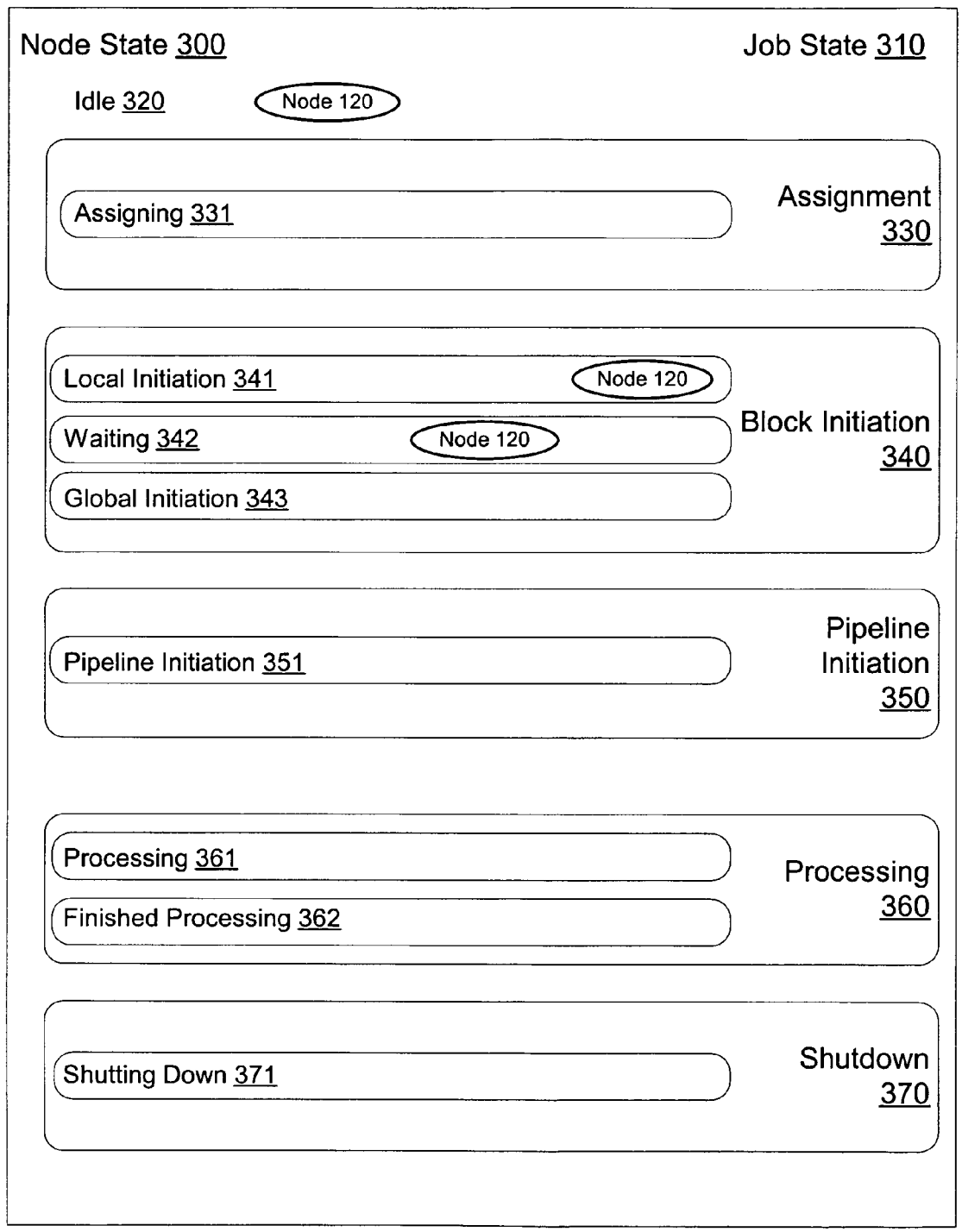
Figure 3E:
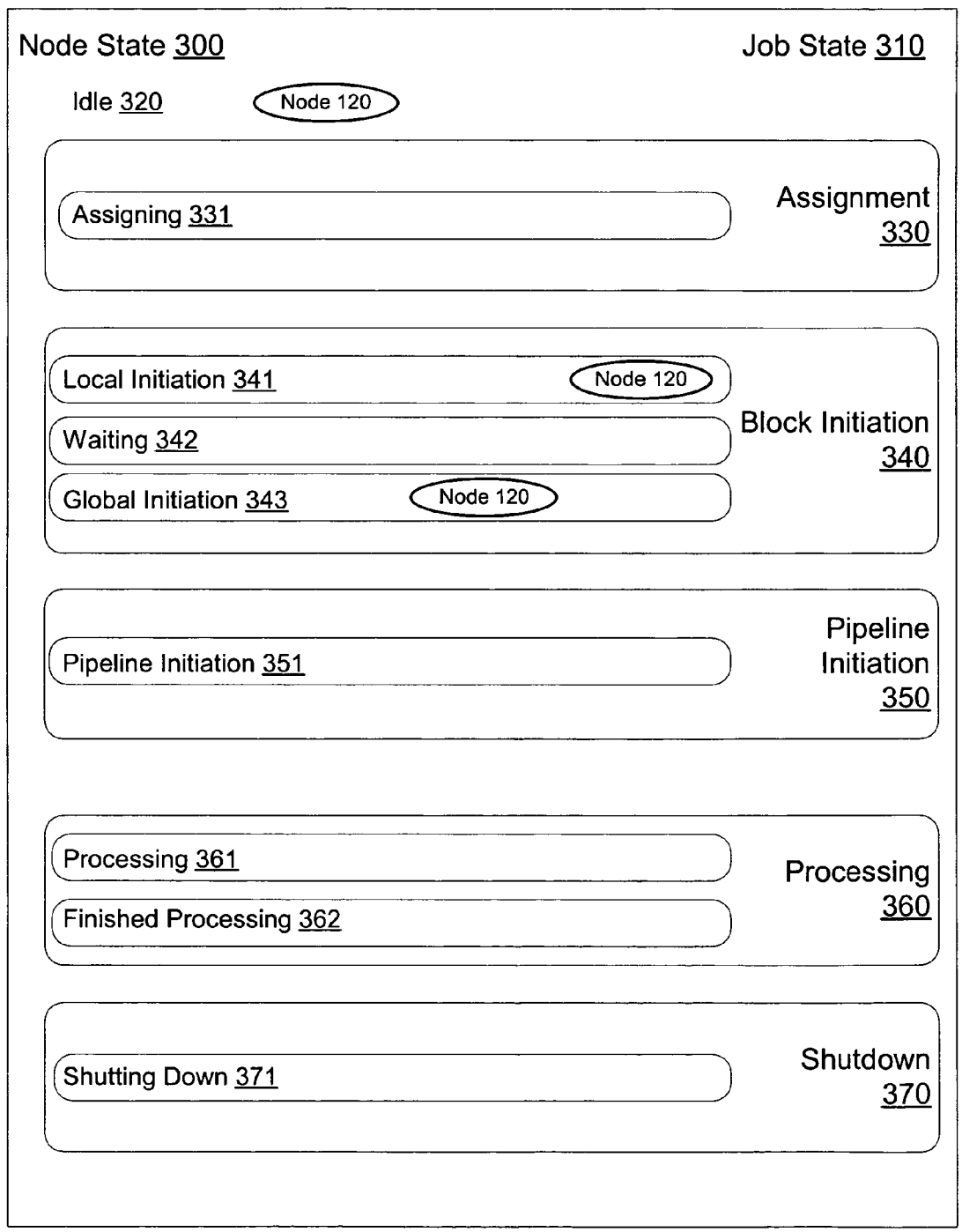
Figure 3F:
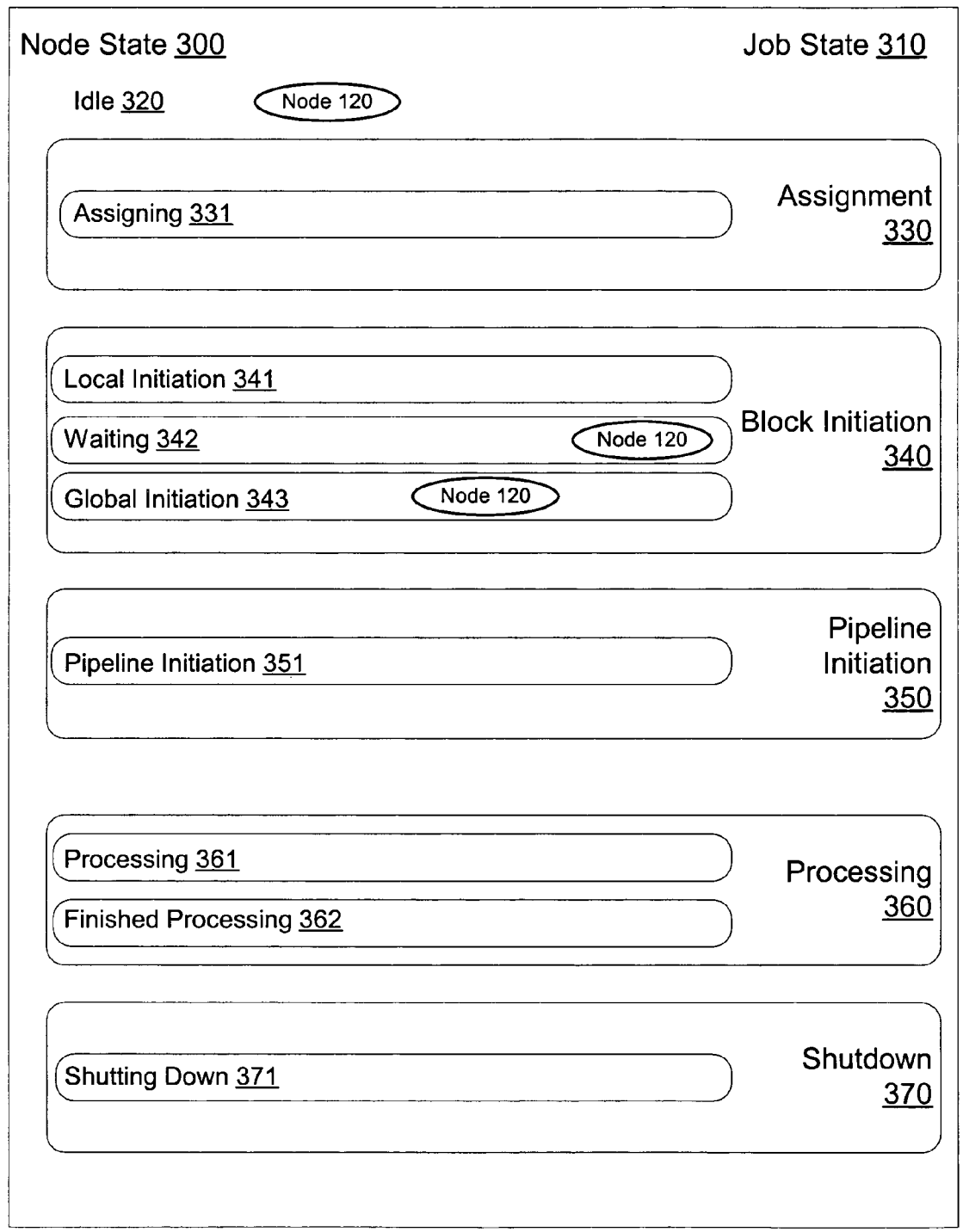

Turning now to FIGS. 3A-3L, the embodiments of the present invention employ a distributed management strategy in which the nodes 120 through node states 300 to collectively advance a job through a set of job states 310. As described above, the nodes 120 perform job maintenance tasks on an as needed basis. However, exactly which node will perform which task is not known a priori. Looking now to FIG. 3A, the nodes 120 all start in a idle state 320. Referring now to FIG. 3B, the first task in the job lifecycle is to assign nodes to the job 330. Nodes 120 that are not assigned to a job monitor the job table looking for jobs new jobs or jobs whose start times are less than or equal to the current time. The first node to notice that a job should be started looks at the job (by referring to the database 140) and assigns nodes to the job in node status 331. The job assignment 330 specifies minimum and maximum numbers of nodes and the system has parameters to control how nodes are assigned to jobs in terms of job requirements, load balancing strategies, and other factors. Once its nodes have been assigned, the job progresses to the assigned state.

Referring now to FIGS. 3C-3F, the next job state is block initiation 340. All unassigned nodes 120 poll the database 140 at a specified interval. When a node 120 is assigned to a job (by an assigning node in job state 330), the assigned node 120 sees its state change in the database and initializes itself in local initiation node state 341. This location initiation allows the assigned node to get ready to process the job, including the preloading of any data to be cached locally. Continuing with FIG. 3D, the first of the assigned nodes to complete initialization progresses to waiting node state 342. In waiting node state 342, the node 120 polls the database 140 and sees that the job is in need of blocking initialization job state 340. The node then advances to global initiation node state 343 in which the node 120 locks the job, updates the job's state to blocking initialization, and begins to perform the initialization. The other assigned nodes 120 monitor the node doing the initialization. Looking now to FIG. 3F, if the initializing node 120 in the global initiation node state 343 fails to complete the initialization within the required time, one of the other nodes in the waiting node state 342 sends a kill signal to the pool manager of the initializing node and tries to redo the initialization. In other words, one of the other nodes in the waiting node state 342 advances to the global initiation node state 343 and attempts to complete the block initialization job state 340.

Figure 3G:
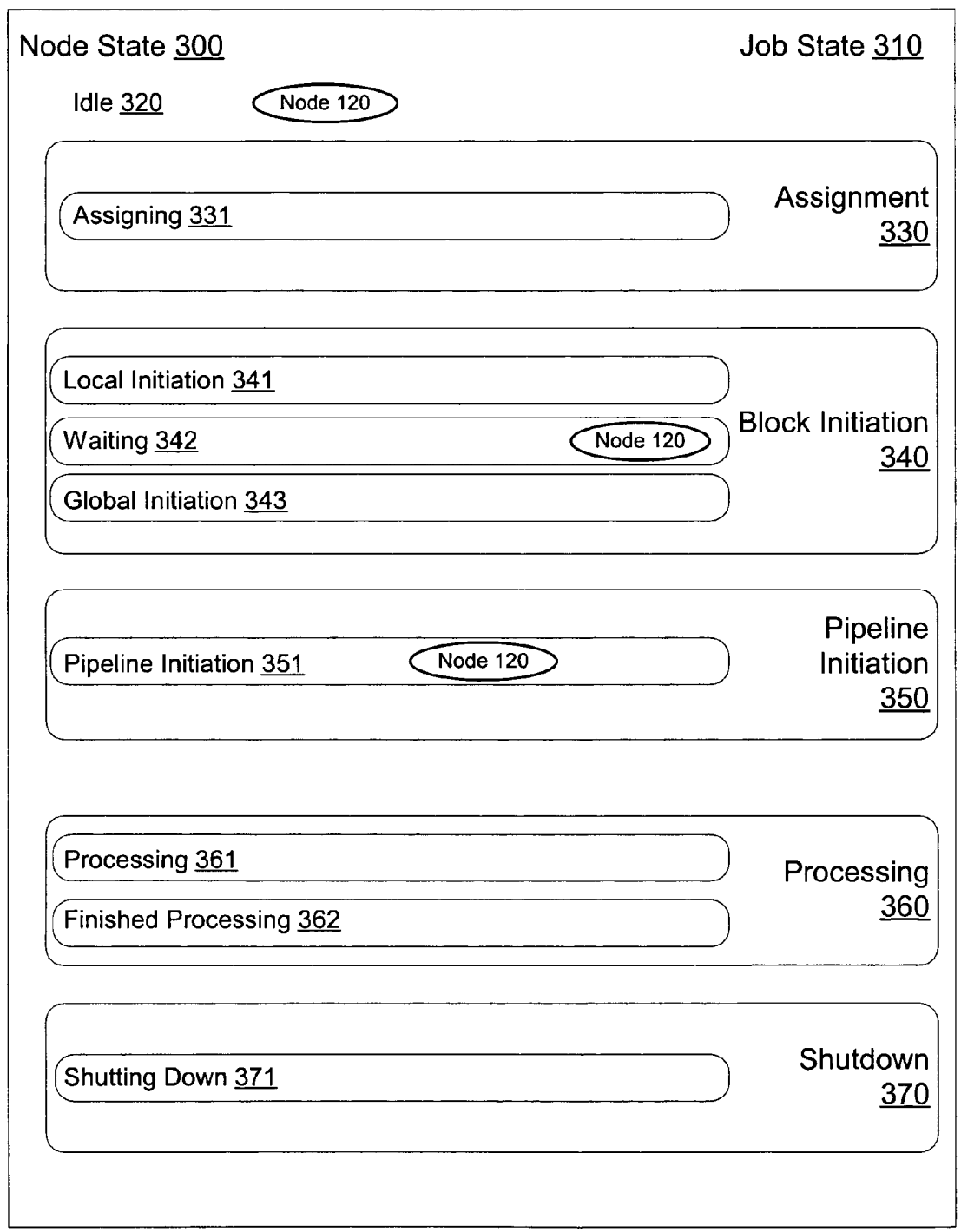
Figure 3H:
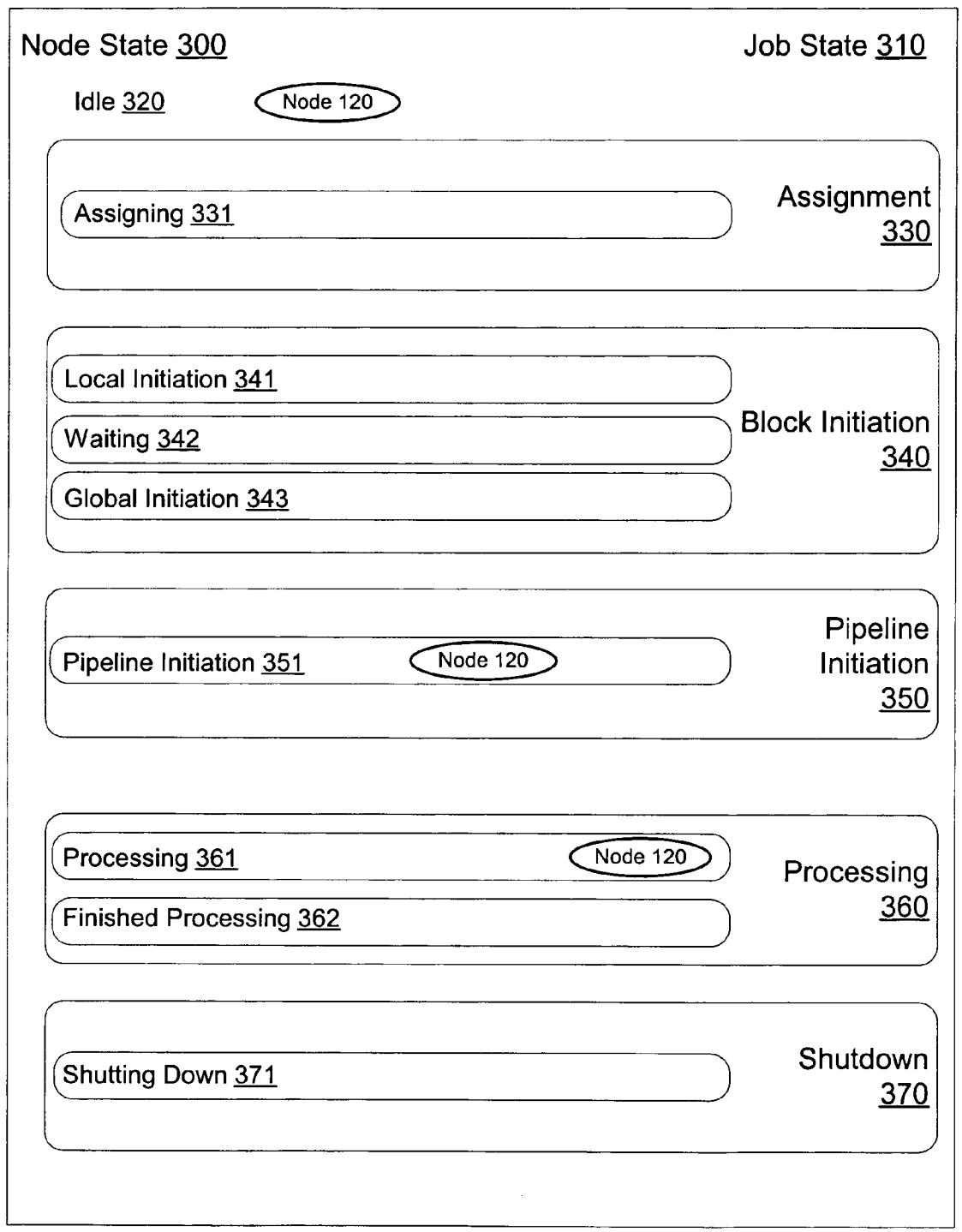
Figure 3I:
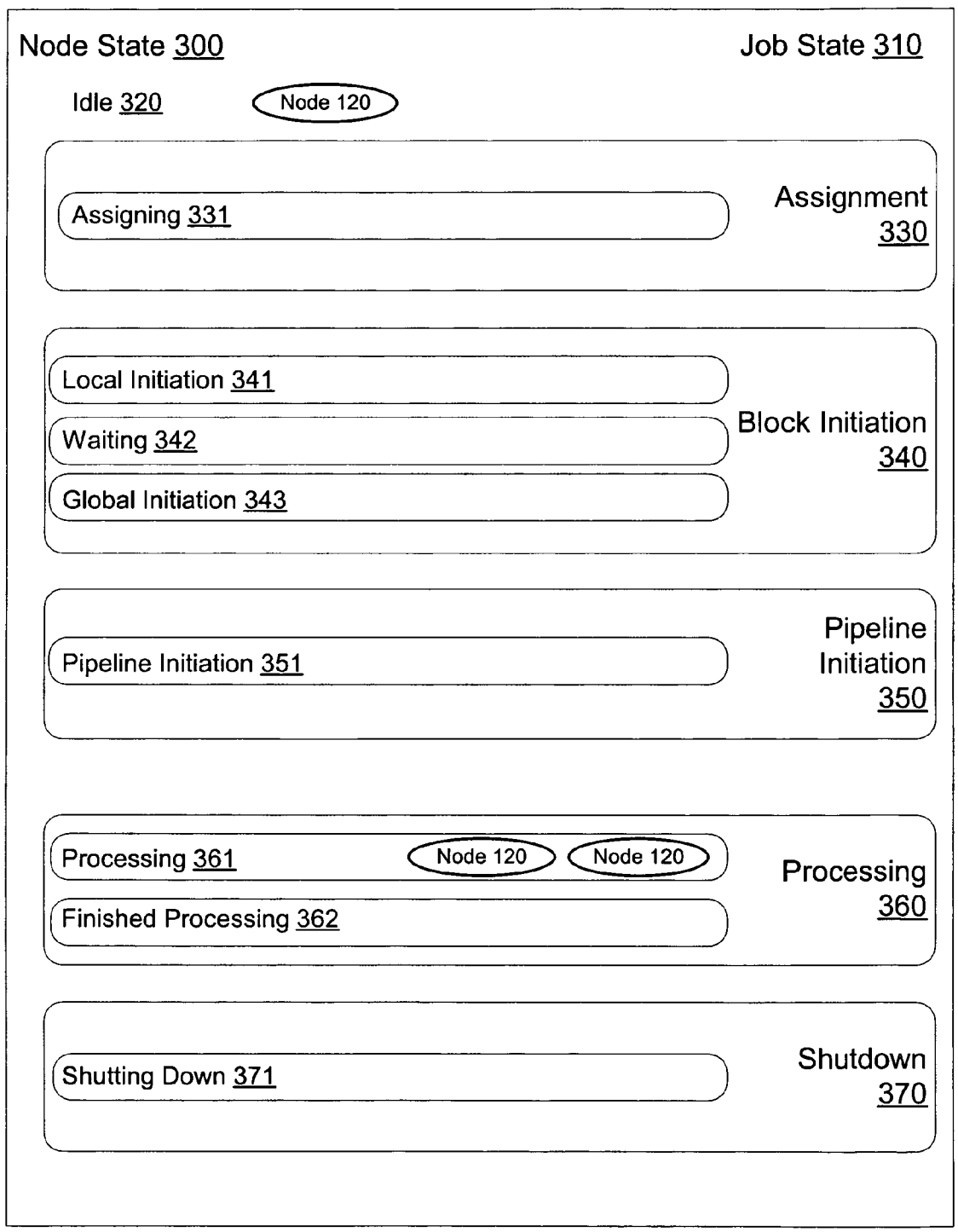
Figure 3J:
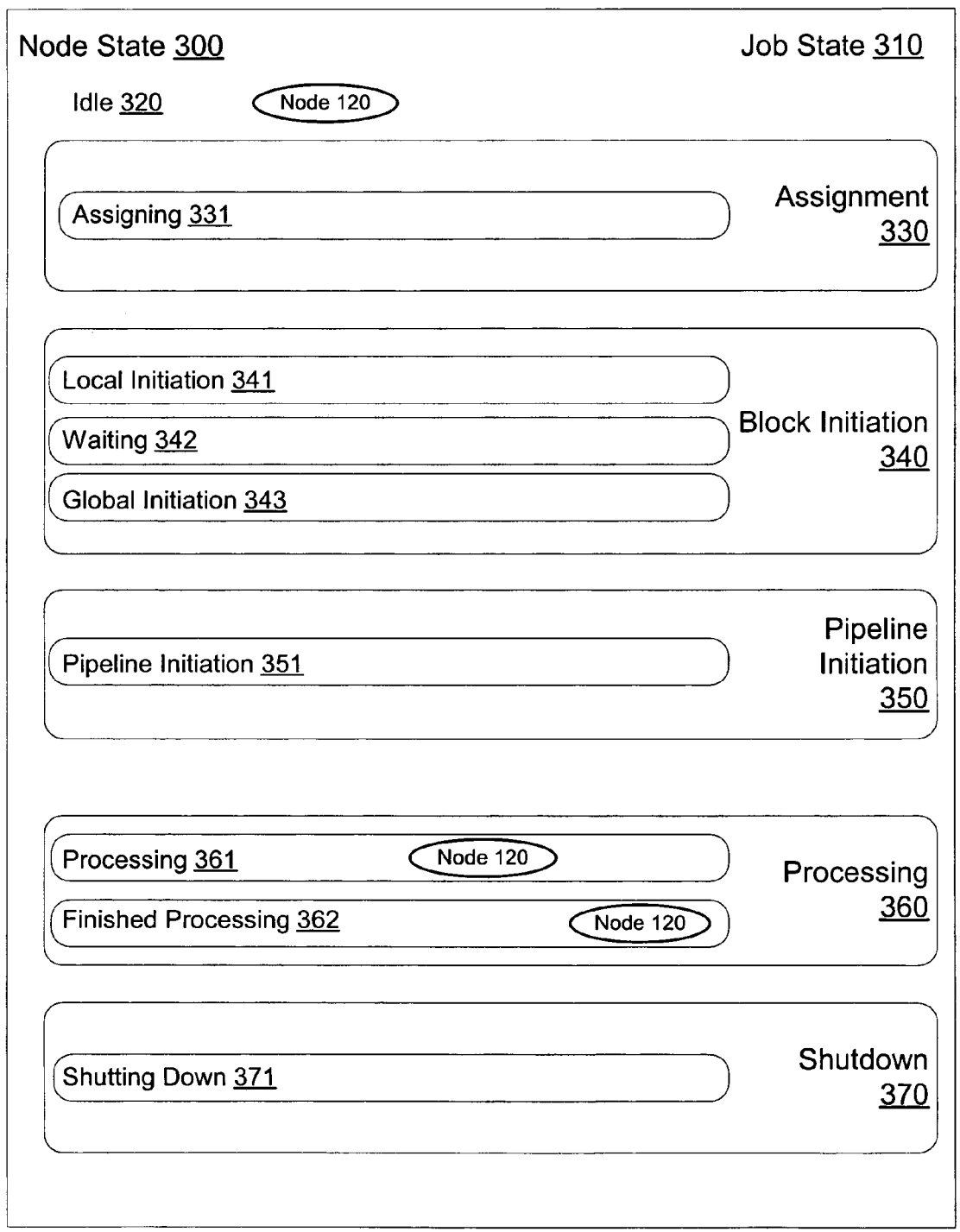

Looking now to FIG. 3G, once blocking initialization job state 340 is completed, the initializing node sets the job to non-blocking initialization. The first node 120 to notice that the job is in non-blocking pipeline initialization job state 350 begins to perform the actions in the pipeline initialization node state 351. As depicted in FIG. 3H, the other assigned nodes may go into the processing job state 360 because during non-blocking initialization, other assigned nodes may start processing work in processing node state 361. Non-blocking initialization job state 350 continues job setup but in a manner that the other nodes can start processing units. For instance, in many algorithms, pipeline initialization job state 350 is the stage in which work units are defined in an incremental manner so that other nodes 120 may begin processing the initial units while the initializing node 120 is defining the remaining units before entering the processing job state 360, as depicted in FIG. 3I. For multi-processor, multi-machine configurations this increases resource utilization and reduces job runtime. As is the case in all the job states 310, the nodes 120 are monitoring each other and will step in to replace any node that misses its specified heartbeat interval. Heartbeat intervals, as described above, are specific to the node state 300, so varying heartbeat intervals can be set for local initialization, blocking initialization, non-blocking initialization, processing and the other states described below. This is important because some states (particularly initialization states) require long synchronous operations during which it is difficult or impossible to post application heartbeats.

To illustrate in detail how this works, a typical message producer, as used to publish messages to a topic in a pub/sub messaging system, is now examined. Please note that exception handling code has been omitted in this discussion for clarity.

During the processing node state 361, the nodes 120 implement self-monitoring, and while healthy, the nodes 120 provide an application heartbeat at a specified interval. The application heartbeat signifies that each thread is making reasonable progress at the supply chain level. For nodes that adopt the pipeline architecture described below, the framework transparently implements the application heartbeat. Since the nodes 120 monitor each other's heartbeats through the database 140, if a heartbeat is not sent, one of the other nodes will sense the issue and initiate a recovery process as described above. To support recovery, the nodes also need to conform to a check out/process/report completion contract for processing units from the database. The recovering node requires this information to orchestrate a recovery if a node fails. The node must also define the compensating transactions that are necessary to reprocess a checked out batch that may have been reprocessed. The embodiment of the present invention may define the signature for the compensating transaction as a virtual method and calls the method at the appropriate time during recovery. The actual implementation of the method is application specific.

Figure 3K:
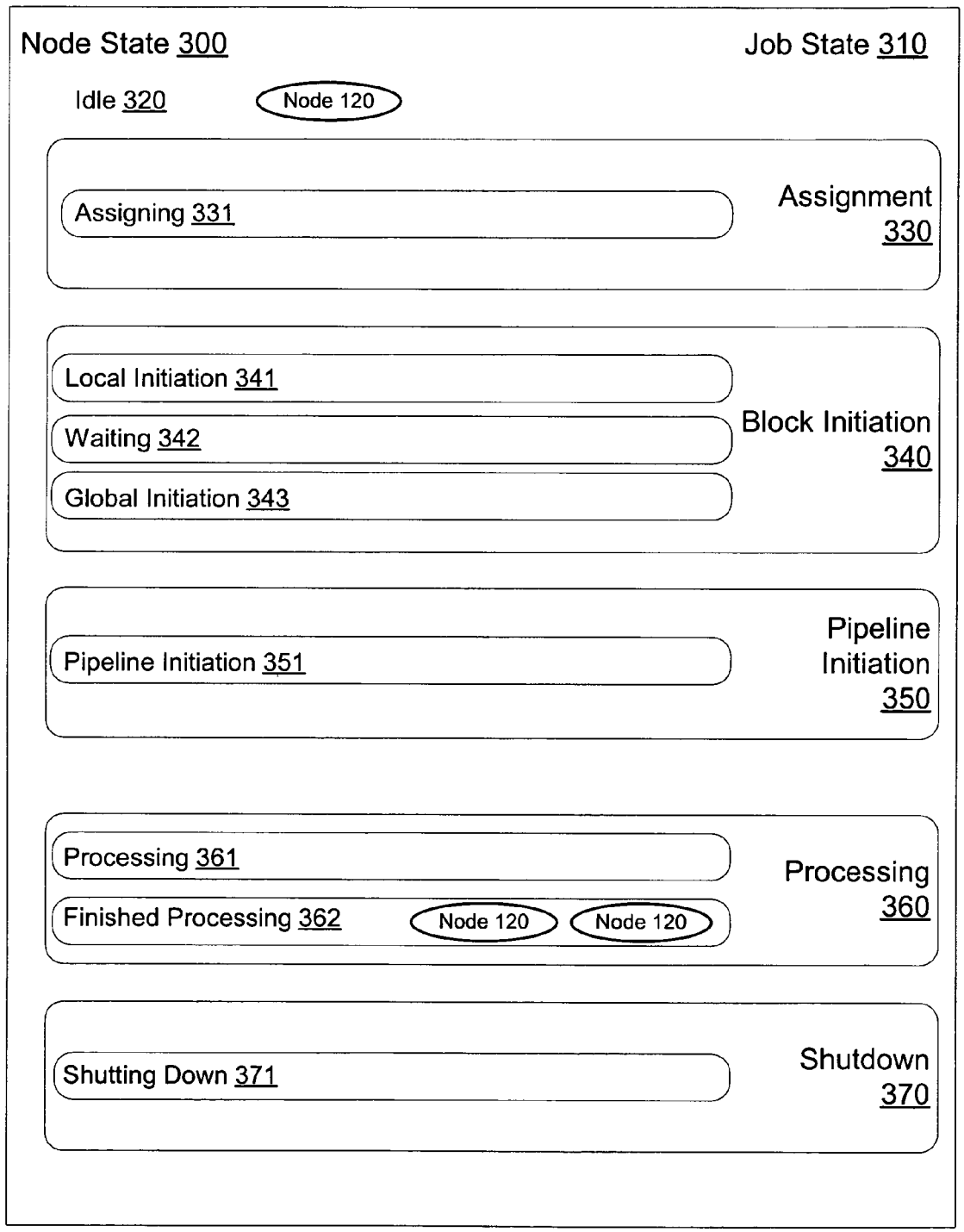
Figure 3L:
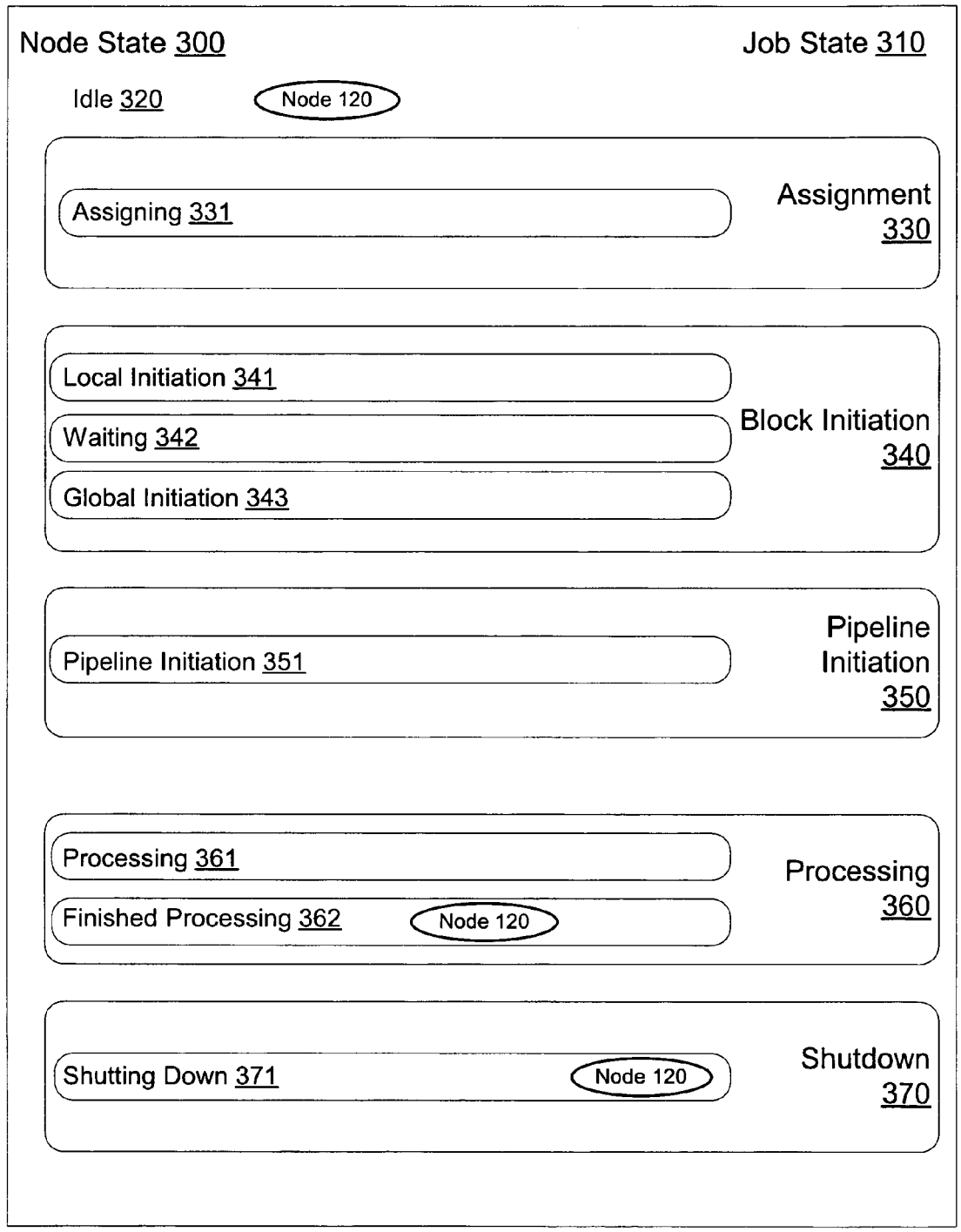

During processing state 360, each processing node monitors progress on the group. Nodes continue to check out and process units in the group until no units are available. At that point depicted in FIG. 3J, nodes wait in finished processing node state 362 and monitor nodes that are still in processing node state 361. Once the last unit for the group has been processed, as depicted in FIG. 3K, the nodes move on to the next group if one exists or move into shutdown in if no groups are left, as depicted in FIG. 3L.

In the case of loss of heartbeat or an exception while waiting to move to the next level, the node that detects the issue orchestrates a recovery, as described above, by requesting a graceful shutdown of the node. If that shutdown does not occur in a timely manner, one of the healthy nodes on the job locks the faulty node out of the database (i.e., kill its connections), finds the units that were checked out by the killed node, and executes compensating transactions to undo any partial results. These units are then processed by the node performing the recovery and/or the other waiting nodes on the job (if any).

To support the recovery process, the architecture implicitly assumes at least 3 statuses for units:

Not yet processed

Currently being processed

Done processing

For recovery, the algorithm may need additional statuses, or it might simply reset the status to not yet processed. In embodiments of the present invention, the particular algorithm implementations have complete autonomy on group definition and statuses. The initializing node sets the definitions initially, the nodes read and update them, the controller resets them in the event of recovery, and nodes might have a special recovery mode that reads and updates them differently.

The particular algorithms define compensating transactions as needed. In fact, for some algorithms the compensating transaction maybe to do nothing. The architecture "automatically" identifies the units that were in process by a lost node and requests compensating transactions be performed. Typically, the compensating transaction deletes any outputs that might have been written to the database for the partially processed node. As should be appreciated, this task is algorithm specific.

Figure 4:
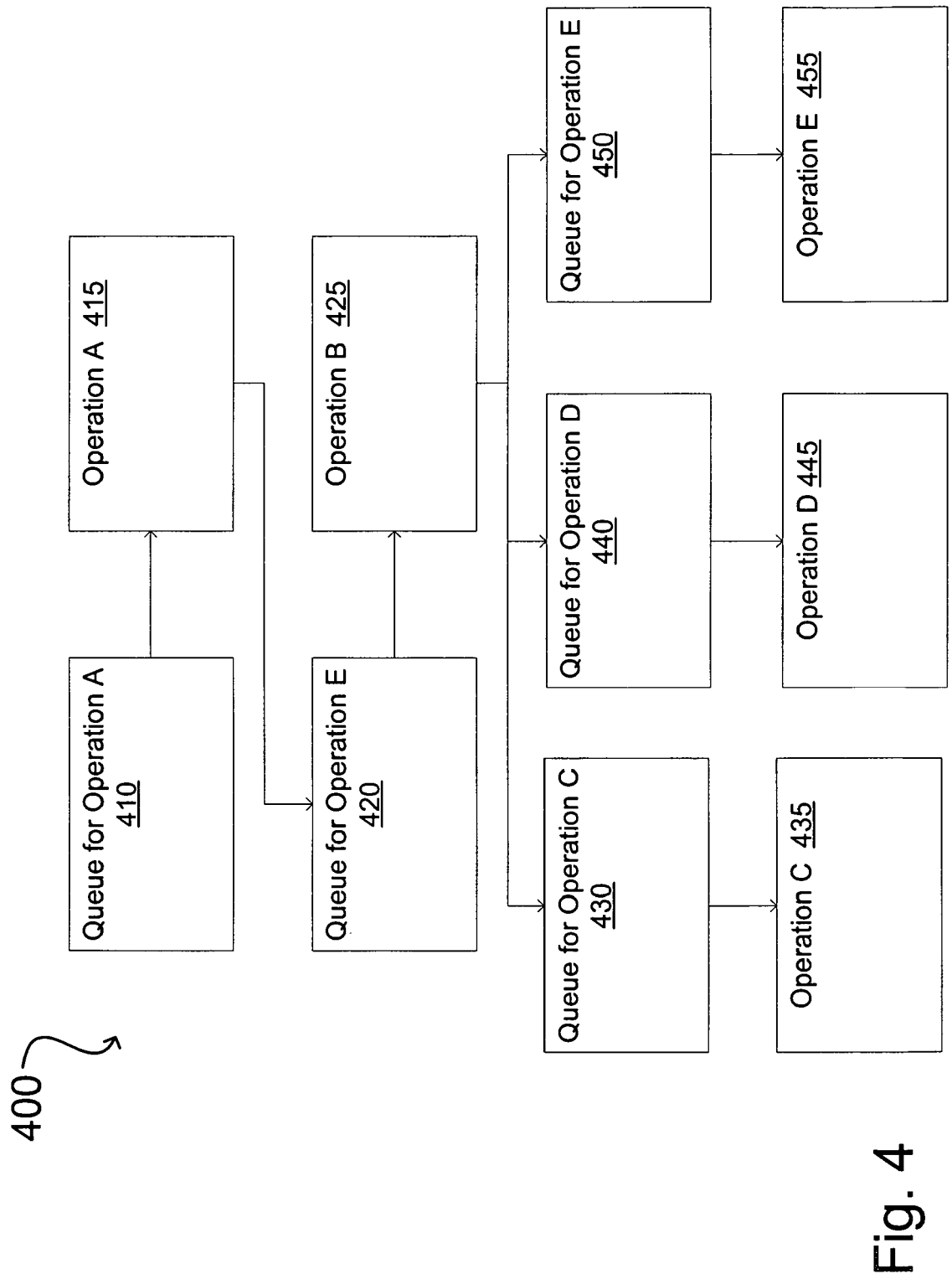
FIG. 4 depicts a pipeline architecture in accordance with embodiments of the present invention.
Figure 5:
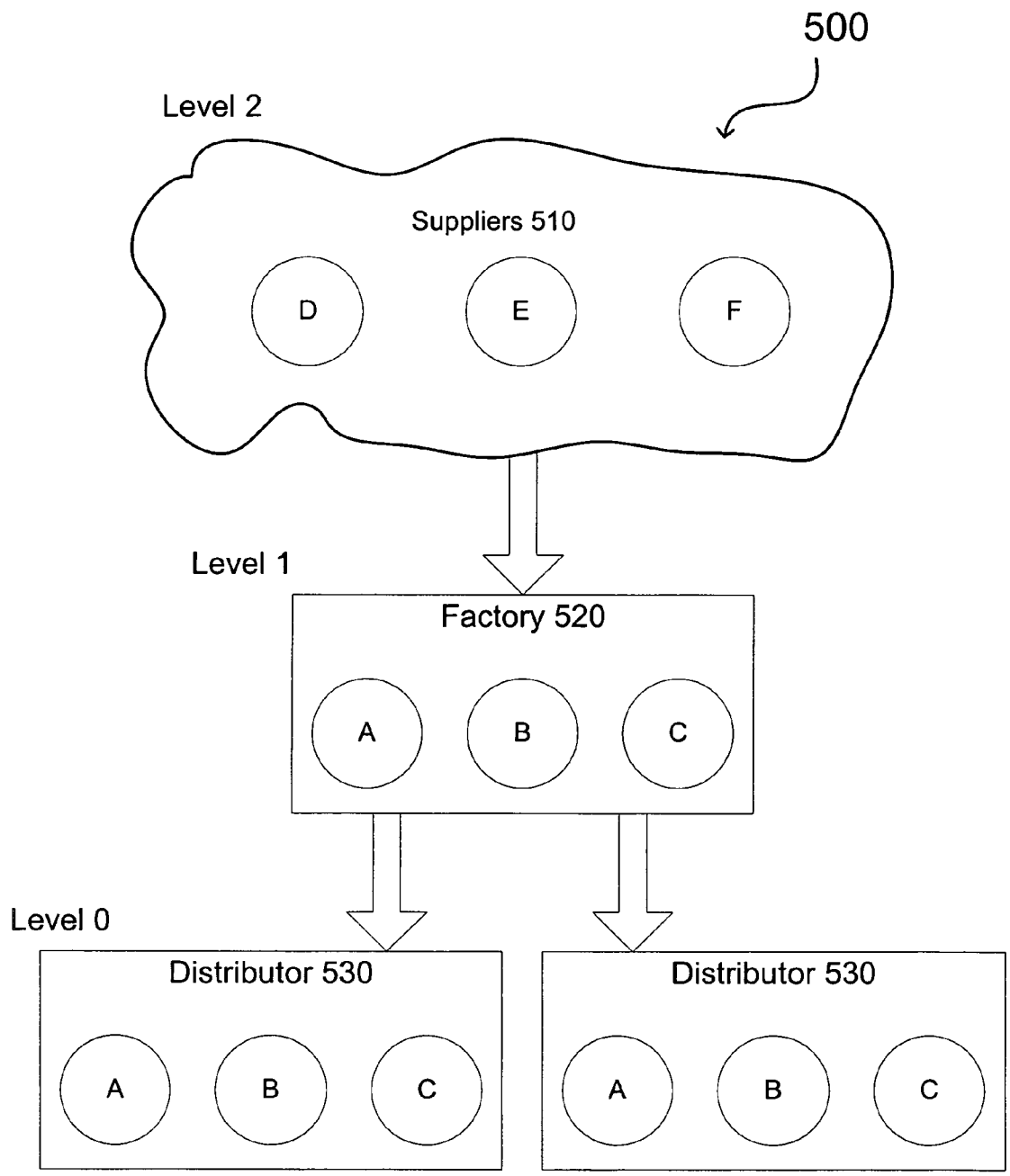
FIG. 5 (PRIOR ART) depicts the elements in a typical replenishment network.

Thus, this Intra-Process Architecture provides a multi-stage, multi-threaded pipeline with a monitor thread that monitors "application heartbeat" indicated whether all threads still running and each is still accomplishing work Alternatively, the nodes may operate with a node acting as a central controller as depicted in FIG. 1A-1B. The central controller explicitly directs the activities of a job. The centralized controller architecture is somewhat simpler to understand but unless the central controller is implemented with redundancy presents a single point of failure from a fault tolerance perspective. In a centralized controller implementation, one-or more if redundancy is implemented for fault tolerance-node performs all of the job status transition logic such as initialization and shutdown. The other nodes essentially operate only in the processing state, under the direction of the controller, for the duration of the job Turning now to FIG. 4, a pipeline architecture 400 of certain embodiments implements bounded queues between pipeline stages. In FIG. 4, each of the operations 415, 425, 435, 445, and 455 has an associated queue 410, 420, 430, 440, and 450. This maximizes efficiency by building a work buffer in front of the bottleneck stage that guarantees the bottleneck stage always has available work. Each of the queues 410, 420, 430, 440, and 450 implement an automatic wait when a pipeline thread attempts to put a work unit into a full queue or get a work unit from an empty queue. The wait inherently causes threads associated with non-bottleneck pipeline stages to yield processor cycles to threads in the bottleneck stage. This feature maximizes resources applied to the bottleneck and, therefore, maximizes total system throughput. Specifically, system resources may be allocated to various computational processes while other nodes are delayed with slower processes or awaiting the results from the slower processes. Referring back to FIGS. 3A-3L, new jobs may be initiated and performed using available nodes while other nodes are still in processing job state 360.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. Many embodiments of the invention can be made without departing from the spirit and scope of the invention.

The invention claimed is:

1. A supply chain management system, comprising:
   a plurality of computer systems, wherein each computer system comprises: a plurality of computational nodes each capable of executing jobs related to supply chain management and providing a job output, each computational node having no communication link to any other computational node;
   a database stores planning instructions and planning data for the jobs as executed on the plurality of computational nodes; and
   a database messaging system including,
      (a) a controller,
      (b) a first communication link coupled between the controller and the database,
      (c) a plurality of second communication links respectively coupled between the controller and each of the plurality of computational nodes for transmitting messages between the controller and each of the plurality of computational nodes, the second communication links each having a communication bandwidth, and
      (d) a plurality of third communication links respectively coupled between each of the plurality of computations nodes and the database for accessing the planning instructions and planning data from the database to execute the jobs on the plurality of computational nodes and sending the job output to the database, the third communication links each having a communication bandwidth greater than the communication bandwidth of the second communication links; wherein the plurality of computational nodes communicates with the database asynchronously and the jobs execute asynchronously on the plurality of computational nodes according to the planning instructions and planning data received from the database;
      wherein the controller synchronizes the jobs for execution on the plurality of computational nodes by detecting a job processing request and assigning one of the plurality of computational nodes to execute the job.

2. The supply chain management system of claim 1, wherein the database resides on multiple computing systems.

3. The supply chain management system of claim 1, wherein the controller schedules the jobs for execution on the plurality of computational nodes.

4. The supply chain management system of claim 1, wherein the controller detects a job failure on one of the plurality of computational nodes and reschedules the failed job for execution on one of the plurality of computational nodes.

5. The supply chain management system of claim 1, wherein the plurality of computational nodes includes a distributed computing network.

6. A computer implemented method of managing a supply chain, comprising:
   storing planning instructions and planning data for jobs related to supply chain management on a database;
   scheduling the jobs for execution on a plurality of computational nodes through a controller, wherein each computational node has no communication link to any other computational node;
   routing communications between the controller and database through a first communication link;
   routing messages between the controller and plurality of computational nodes through a plurality of second communication links, the second communication links each having a communication bandwidth, wherein the controller synchronizes the jobs for execution on the plurality of computational nodes by detecting a job processing request and assigning one of the plurality of computational nodes to execute the job;
   routing the planning instructions and planning data between the database and plurality of computational nodes through a plurality of third communication links, wherein the plurality of computational nodes communicates with the database asynchronously, the third communication links each having a communication bandwidth greater than the communication bandwidth of the second communication links; and executing the jobs on the plurality of computational nodes asynchronously according to the planning instructions and planning data received from the database, and sending jobs output to the database.

7. The computer implemented method of claim 6, wherein the database resides on multiple computing systems.

8. The computer implemented method of claim 6, further including:
  detecting a job failure on one of the plurality of computational nodes; and
  rescheduling the failed job for execution on one of the plurality of computational nodes.

9. The computer implemented method of claim 6, further including distributing the plurality of computational nodes across a computing network.

10. A computer program storage product usable with a programmable computer processor having computer readable program code embodied therein, comprising:
  computer readable program code which stores planning instructions and planning data for jobs related to supply chain management on a database;
  computer readable program code which schedules the jobs for execution on a plurality of computational nodes through a controller, wherein each computational node has no communication link to any other computational node;
  computer readable program code which routes communications between the controller and database through a first communication link;
  computer readable program code which routes messages between the controller and plurality of computational nodes through a plurality of second communication links, the second communication links each having a communication bandwidth, wherein the controller synchronizes the jobs for execution on the plurality of computational nodes by detecting a job processing request and assigning one of the plurality of computational nodes to execute the job;
  computer readable program code which routes the planning instructions and planning data between the database and plurality of computational nodes through a plurality of third communication links, wherein the plurality of computational nodes communicates with the database asynchronously, the third communication links each having a communication bandwidth greater than the communication bandwidth of the second communication links; and
  computer readable program code which executes the jobs on the plurality of computational nodes asynchronously according to the planning instructions and planning data received from the database, and sending jobs output to the database.

11. The computer program storage product of claim 10, wherein each computational node has no communication link to any other computational node.

12. The computer program storage product of claim 10, further including:
  computer readable program code which detects a job failure on one of the plurality of computational nodes; and
  computer readable program code which reschedules the failed job for execution on one of the plurality of computational nodes.

13. The computer program storage product of claim 10, further including computer readable program code which provides for distribution of the plurality of computational nodes across a computing network.

\* \* \* \* \*